United States Patent
Ward, Jr.

(10) Patent No.: US 10,686,677 B1
(45) Date of Patent: Jun. 16, 2020

(54) FLEXIBLE CAPACITY RESERVATIONS FOR NETWORK-ACCESSIBLE RESOURCES

(75) Inventor: David John Ward, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 914 days.

(21) Appl. No.: 13/475,359

(22) Filed: May 18, 2012

(51) Int. Cl.
*H04L 12/24* (2006.01)
*H04L 12/911* (2013.01)

(52) U.S. Cl.
CPC ........ *H04L 41/5054* (2013.01); *H04L 47/788* (2013.01)

(58) Field of Classification Search
CPC .............................. G06Q 10/00; G06F 15/173
USPC .......................................................... 709/226
See application file for complete search history.

(56) References Cited

U.S. PATENT DOCUMENTS

| | | | |
|---|---|---|---|
| 5,692,174 A | 11/1997 | Bireley et al. | |
| 6,421,728 B1 | 7/2002 | Mohammed et al. | |
| 6,493,685 B1 | 12/2002 | Ensel et al. | |
| 7,356,770 B1 * | 4/2008 | Jackson ................ | G06F 9/5072 715/735 |
| 7,412,538 B1 | 8/2008 | Eytchison et al. | |
| 7,637,426 B1 | 12/2009 | Green | |
| 7,743,001 B1 | 6/2010 | Vermeulen et al. | |
| 7,768,920 B2 | 8/2010 | Goshen et al. | |
| 7,818,191 B2 * | 10/2010 | Lutnick et al. ................... | 705/5 |
| 7,870,044 B2 | 1/2011 | Robertson | |
| 8,024,225 B1 * | 9/2011 | Sirota et al. ................. | 705/26.1 |
| 8,055,493 B2 | 11/2011 | Rolia et al. | |
| 8,346,624 B2 * | 1/2013 | Goad et al. ................... | 705/26.7 |
| 8,595,191 B2 | 11/2013 | Prahlad et al. | |
| 8,615,584 B2 | 12/2013 | Dawson et al. | |
| 8,635,113 B2 * | 1/2014 | Borders et al. .............. | 705/27.1 |
| 2002/0069094 A1 * | 6/2002 | Bingham et al. ................. | 705/5 |

(Continued)

OTHER PUBLICATIONS

Amazon Web services, AmazonEC2 retrieved May 3, 2018, retrieved at: https://web.archive.org/web/20110515232232/aws.amazon.com/ec2/ Archived by the Wayback Machine, May 15, 2011, p. 1-9 (Year: 2011).*

(Continued)

*Primary Examiner* — Backhean Tiv
*Assistant Examiner* — Joseph M Cousins
(74) *Attorney, Agent, or Firm* — Robert C. Kowert; Kowert, Hood, Munyon, Rankin & Goetzel, P.C.

(57) ABSTRACT

Methods and apparatus for flexible capacity pool reservations for network-accessible resources are disclosed. A system includes a plurality of resources of a provider network, and a resource manager. The resource manager receives a reservation modification request from a client that has an existing reservation for an original resource capacity and an original reservation duration. The modification request specifies a desired resource capacity. The reservation manager identifies resources to provide the desired capacity, and determines pricing components for the requested modification based on the difference between the desires resource capacity and the original capacity and on the remaining portion of the duration of the existing reservation. The resource manager modifies the reservation as requested and notifies the client regarding the pricing components.

24 Claims, 10 Drawing Sheets

(56) References Cited

U.S. PATENT DOCUMENTS

| | | |
|---|---|---|
| 2003/0028642 A1 | 2/2003 | Agarwal et al. |
| 2003/0088482 A1 | 5/2003 | Blumberg |
| 2003/0126196 A1 | 7/2003 | Lagimonier et al. |
| 2003/0191792 A1* | 10/2003 | Waki et al. ............... 709/100 |
| 2003/0229529 A1 | 12/2003 | Mui et al. |
| 2004/0030740 A1 | 2/2004 | Stelting |
| 2004/0243430 A1 | 12/2004 | Horstemeyer |
| 2006/0159014 A1 | 7/2006 | Breiter et al. |
| 2007/0180436 A1* | 8/2007 | Travostino ........... G06F 9/4856 717/138 |
| 2007/0219837 A1 | 9/2007 | Lu et al. |
| 2008/0080396 A1* | 4/2008 | Meijer et al. ............ 370/254 |
| 2008/0103848 A1 | 5/2008 | Santos et al. |
| 2008/0109557 A1* | 5/2008 | Joshi et al. ............. 709/231 |
| 2008/0167928 A1 | 7/2008 | Cao et al. |
| 2008/0243666 A1 | 10/2008 | Rowan |
| 2009/0049114 A1 | 2/2009 | Faraj |
| 2009/0182598 A1 | 7/2009 | An et al. |
| 2009/0276771 A1 | 11/2009 | Nickolov et al. |
| 2009/0281952 A1 | 11/2009 | Toffey et al. |
| 2009/0300635 A1 | 12/2009 | Ferris |
| 2010/0010657 A1 | 1/2010 | Do et al. |
| 2010/0050172 A1 | 2/2010 | Ferris |
| 2010/0070397 A1 | 3/2010 | Hahn-Carlson et al. |
| 2010/0131624 A1 | 5/2010 | Ferris |
| 2010/0131649 A1 | 5/2010 | Ferris |
| 2010/0217865 A1 | 8/2010 | Ferris |
| 2010/0241479 A1 | 9/2010 | Chaushev |
| 2010/0306379 A1 | 12/2010 | Ferris |
| 2010/0306767 A1* | 12/2010 | Dehaan ............... G06F 9/5022 718/1 |
| 2010/0319004 A1* | 12/2010 | Hudson ............... G06F 9/5072 719/313 |
| 2011/0119104 A1 | 5/2011 | Levine et al. |
| 2011/0131335 A1 | 6/2011 | Spaltro et al. |
| 2011/0137805 A1 | 6/2011 | Brookbanks et al. |
| 2011/0138050 A1 | 6/2011 | Dawson et al. |
| 2011/0138051 A1 | 6/2011 | Dawson et al. |
| 2011/0145094 A1 | 6/2011 | Dawson et al. |
| 2011/0145392 A1 | 6/2011 | Dawson et al. |
| 2011/0154353 A1 | 6/2011 | Theroux et al. |
| 2011/0161964 A1 | 6/2011 | Piazza et al. |
| 2011/0173038 A1 | 7/2011 | Moon et al. |
| 2011/0173626 A1 | 7/2011 | Chi et al. |
| 2011/0173637 A1* | 7/2011 | Brandwine et al. ........ 719/314 |
| 2011/0179132 A1 | 7/2011 | Mayo et al. |
| 2011/0202657 A1 | 8/2011 | Chang |
| 2011/0213691 A1 | 9/2011 | Ferris et al. |
| 2011/0213712 A1 | 9/2011 | Hadar et al. |
| 2011/0231899 A1* | 9/2011 | Pulier et al. ............... 726/1 |
| 2011/0238458 A1 | 9/2011 | Purcell et al. |
| 2011/0239039 A1* | 9/2011 | Dieffenbach ........ H04L 41/082 714/4.1 |
| 2011/0295986 A1 | 12/2011 | Ferris et al. |
| 2011/0295998 A1 | 12/2011 | Ferris |
| 2011/0296025 A1 | 12/2011 | Lieblich et al. |
| 2012/0016721 A1* | 1/2012 | Weinman ................ 705/7.35 |
| 2012/0131161 A1* | 5/2012 | Ferris et al. ............. 709/223 |
| 2012/0159506 A1 | 6/2012 | Barham et al. |
| 2012/0173725 A1 | 7/2012 | Verma |
| 2013/0080617 A1* | 3/2013 | Driesen ............... H04L 43/0876 709/224 |
| 2013/0090959 A1* | 4/2013 | Kvamme et al. ............. 705/5 |
| 2013/0111027 A1 | 5/2013 | Milojicic et al. |
| 2013/0173418 A1 | 7/2013 | Goad et al. |
| 2013/0212279 A1 | 8/2013 | Dutta et al. |
| 2013/0212281 A1* | 8/2013 | Melander ........... G06F 9/45533 718/1 |
| 2013/0232252 A1 | 9/2013 | Huang et al. |
| 2013/0238785 A1 | 9/2013 | Hawk et al. |
| 2013/0246208 A1 | 9/2013 | Jain et al. |
| 2014/0082612 A1* | 3/2014 | Breitgand ........... G06F 9/45533 718/1 |

OTHER PUBLICATIONS

Eric Hammond, A Personal AWS Blog, Alestic, retrieved at https://alestic.com/2011/02/ec2-change-type/ publication date: Feb. 2, 2011, p. 1-2 (Year: 2011).*

Agarwal, Sharad, et al. "Volley: Automated Data Placement for Geo-Distributed Cloud Services." 2010, pp. 1-16.

U.S. Appl. No. 13/535,720, filed Jun. 28, 2012, Matthew D. Klein, et al.

U.S. Appl. No. 13/535,715, filed Jun. 28, 2012, Matthew D. Klein, et al.

U.S. Appl. No. 13/535,707, filed Jun. 28, 2012, Matthew D. Klein, et al.

U.S. Appl. No. 13/535,725, filed Jun. 28, 2012, Matthew D. Klein, et al.

AWS Documentation, "Using Cluster Instances," downloaded from docs.amazonwebservices.com/AWSEC2/latest/UserGuide/using_cluster_computing.html on May 16, 2012, pp. 1-6.

Amazon Web Services: AWS Products & Solutions, "High Performance Computing (HPC) on AWS," downloaded from aws.amazon.com/hpc-applications/ on May 16, 2012, pp. 1-3.

Timo Schneider (personal website), "An Oblivious Routing Congestion Simulator," downloaded from perlplexity.org/Research/ORCS/ on May 16, 2012, pp. 1-8.

U.S. Appl. No. 13/431,379, filed Mar. 27, 2012, David John Ward, Jr.

U.S. Appl. No. 13/431,388, filed Mar. 27, 2012, David John Ward, Jr., et al.

U.S. Appl. No. 13/429,957, filed Mar. 26, 2012, David John Ward, Jr., et al.

U.S. Appl. No. 13/431,355, filed Mar. 27, 2012, David John Ward, Jr.

U.S. Appl. No. 13/429,985, filed Mar. 26, 2012, David John Ward, Jr., et al.

U.S. Appl. No. 13/431,348, filed Mar. 27, 2012, David John Ward, Jr.

U.S. Appl. No. 13/431,360, filed Mar. 27, 2012, David John Ward, Jr.

U.S. Appl. No. 13/430,003, filed Mar. 26, 2012, David John Ward, Jr., et al.

U.S. Appl. No. 13/431,393, filed Mar. 27, 2012, David John Ward, Jr.

U.S. Appl. No. 13/475,399, filed May 18, 2012, David John Ward, Jr.

U.S. Appl. No. 13/461,605, filed May 1, 2012, David John Ward, Jr., et al.

U.S. Appl. No. 13/476,828, filed May 21, 2012, David John Ward, Jr., et al.

U.S. Appl. No. 13/475,461, filed May 18, 2012, David John Ward, Jr., et al.

"Amazon EC2 Spot Instance," Amazon Web Services LLC, Downloaded Mar. 26, 2012, 11 pages.

"Amazon EC2 Instance Types," Amazon Web Services LLC, Downloaded Mar. 26, 2012, 5 pages.

"Amazon EC2 Reserved Instances," Amazon Web Services LLC, Downloaded Mar. 26, 2012, 6 pages.

"Amazon EC2 Instance Purchasing Options," Amazon Web Services LLC, Downloaded Mar. 26, 2012, 2 pages.

"Amazon EC2 Pricing," Amazon Web Services LLC, Downloaded Mar. 26, 2012, 8 pages.

U.S. Appl. No. 13/331,750, filed Dec. 20, 2011, Amazon Technologies, Inc., all pages.

Amazon Web Services, "Discussion Forums; Existing Connections Dropped Rudely when Instance Taken out of ELB", Eric Hammond, Feb. 25, 2011, pp. 1-4.

Amazon Web Services, "Amazon Elastic Compute Cloud (Amazon EC2)", Mar. 24, 2011, pp. 1-26.

Amazon Web Services, "Amazon EC2 Pricing", Feb. 28, 2011, pp. 1-13.

Amazon Web Services, "Amazon EC2 Spot Instances", Feb. 24, 2011, pp. 1-5.

(56) References Cited

OTHER PUBLICATIONS

Amazon Web Services, "Amazon CloudWatch", Feb. 24, 2011, pp. 1-5.

\* cited by examiner

800

Reservations Home Page https://<website>.com/reservations

Dear John Doe, Welcome to the resource reservation center!

← 803

Please provide your reservation preferences below.

| Field | Value | Ref |
|---|---|---|
| Resource type (e.g., compute/storage/bandwidth)* | Compute (default) | ← 807 |
| Resource capacity size (e.g., small/medium/large)* | Small (default) | ← 809 |
| Would you like to be able to upgrade/downgrade reserved capacity? Learn more here | No (default) | ← 811 |
| Reservation duration (e.g., 1 year/3 year)* | 1-year (default) | ← 813 |
| Would you like to be able to change the reservation duration later? Learn more here | No (default) | ← 815 |
| Uptime ratio (e.g., low/medium/high)* | Low (default) | ← 817 |
| Would you like to be able to change the uptime ratio later? Learn more here | No (default) | ← 819 |
| Would you like dynamic instance migration capability? Learn more here | No (default) | ← 821 |
| Preferred availability zone | U.S. East AZ001 (default) | ← 823 |
| Base cost | | ← 825 |
| Capacity upgradability charge | $0.00 (default) | ← 827 |
| Reservation term flexibility charge | $0.00 (default) | ← 829 |
| Uptime ratio flexibility charge | $0.00 (default) | ← 831 |
| Total cost of reservation | | ← 833 |

* Required fields

Reserve! ← 891

Reservations Upgrade/Downgrade Page https://<website>.com/upgradeDowngrade

Dear John Doe,
Here is a list of your current reservations. ← 903

Please select the upgrade/downgrade options you would like for each reservation you want to change.

---

Reservation R5787430103 ← 971

You currently have:

> 1 Standard Medium Instance (m1.medium), 3-year term expiring 3/21/2013 ← 905

If you'd like to change the reserved capacity, select from the following options: ← 907

> 1 Standard Large Instance (1 x m1.large): Cost = $CC.dd ← 909

> 2 Standard Small Instances (2 x m1.small): Cost = $AA.bb ← 911

> 1 Standard Small Instance (1 x m1.small) and place 1 Standard Small Instance on Resale Market Cost = $EE.ff ← 913

> Other: I want to specify the change myself ← 915

If you'd like to change the reservation duration, select from the following options: ← 917

> Change term to expire 3/21/2014 ← 919

> Other: I want to specify the change myself ← 921

Next ← 990

*Figure 9*

FLEXIBLE CAPACITY RESERVATIONS FOR NETWORK-ACCESSIBLE RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of long-term resource reservations, customers may typically pay an upfront free for making the reservation, and in addition may have to pay usage-based fees for periods when the reserved resource is activated; several pricing options may be available, for example, based on the level of usage for which the customer is willing to pay. In some cases the initial reservation may be made by the customer on the basis of expectations or projections that may change over the course of the term of the reservation, which could lead to less-than-optimal use of the customer's resource budget.

BRIEF DESCRIPTION OF THE DRAWINGS

FIG. 8 illustrates a portion of an example web-based interface that may be implemented to allow clients to submit resource reservation requests, according to some embodiments.

FIG. 9 illustrates a portion of an example web-based interface that may be implemented to allow clients to submit resource reservation modification requests, according to some embodiments.

Figure 1:
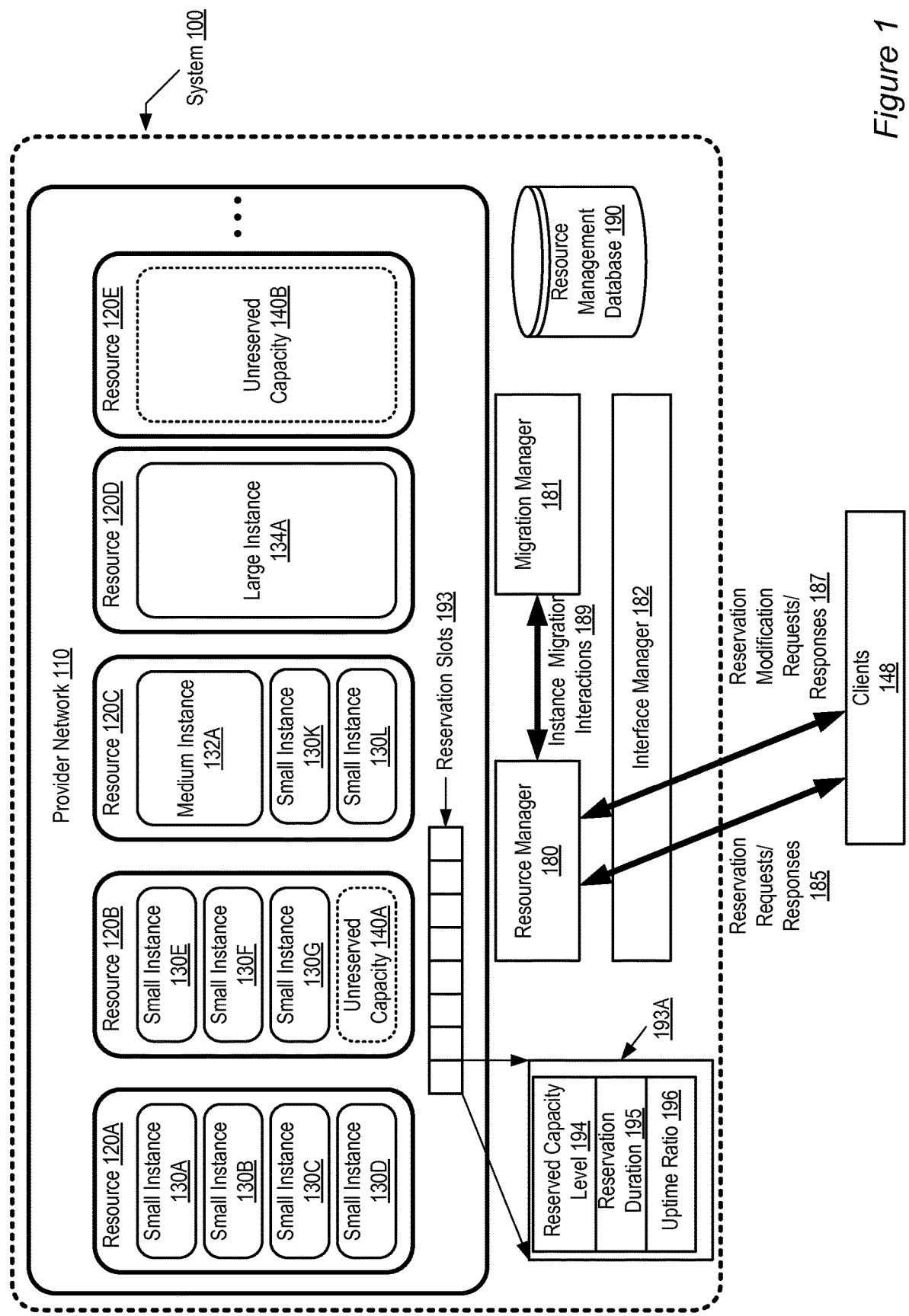
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for managing flexible capacity pool reservations for network-accessible resources are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider. The resources may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

Operators of such provider networks may in some instances implement a flexible set of resource reservation, control and access interfaces for their clients. For example, an interface manager of the provider network may implement a programmatic interface (e.g., via a web site or a set of web pages or an application programming interface (API)) that allows clients to learn about, select, purchase access to, and/or reserve resource instances. Such an interface may include capabilities to allow browsing of a resource catalog, provide details and specifications of the different types or sizes of resources supported, the different reservation types or modes supported, pricing models, and so on. The requests received via the interface or interfaces may be handled by a resource manager, and the responses to the requests may be transmitted via one or more of the interfaces back to the requesting client. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client wishes to activate one or more instances that were previously reserved but had not yet been activated, or to a client that is willing to pay a higher spot price. The resource manager may thus be able to use reserved (but currently unused) resource capacity to meet spot-market demand, or even to satisfy on-demand instance requests, thereby increasing overall resource utilization levels without sacrificing the guarantees for long-term reservations. In addition to long-term reserved instances, on-demand instances and spot instances, other purchasing modes or combinations of modes may be implemented by the resource manager in some embodiments.

In at least some embodiments, reserved instances may be further classified based on expected uptime ratios. The uptime ratio of a particular reserved instance may be defined as the ratio of the amount of time the instance is activated, to the total amount of time for which the instance is reserved. Uptime ratios may also be referred to as utilizations in some implementations. If a client expects to use a reserved instance for a relatively small fraction of the time for which the instance is reserved (e.g., 30%-35% of a year-long reservation), the client may decide to reserve the instance as a "Low Uptime Ratio" instance, and pay a discounted hourly usage fee in accordance with a pricing policy for Low Uptime Ratio reserved instances. If the client expects to have a steady-state workload that requires an instance to be up most of the time, the client may reserve a "High Uptime Ratio" instance and potentially pay an even lower hourly usage fee, although in some embodiments the hourly fee may be charged for the entire duration of the reservation, regardless of the actual number of hours of use, in accordance with the pricing policy for High Uptime Ratio instance. An option for Medium Uptime Ratio instances, with a corresponding pricing policy, may be supported in some embodiments as well, where the upfront costs and the per-hour costs fall between the corresponding High Uptime Ratio and Low Uptime Ratio costs. When selecting resources for reservation requests, the resource manager may take into account the requested uptime ratio as well. For example, if the client requests a Low Uptime Ratio, the resource manager may reasonably expect that the resource eventually activated for the Low Uptime Ratio reservation may be available at least some of the time to satisfy spot instance requests.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster). Some clients may wish to specify the locations at which their resources are reserved and/or instantiated, e.g., at either the region level, the availability zone level, or a data center level, to maintain a desired degree of control of exactly where various components of their applications are run.

Other clients may be less interested in the exact location where their resources are reserved or instantiated, as long as the resources meet the client requirements, e.g., for performance, high availability, supported software levels, and so on.

As noted above, in some embodiments, resources such as compute instances or storage instances of various sizes may be reserved for terms that may be as long as several years. When making or requesting a long-term reservation, a client may be provided the option of selecting the "size" of the instance to be reserved, e.g., from among a plurality of supported instance sizes or performance-related capacity levels. For example, in one simple scenario, three reservable capacity levels may be supported for virtual compute instances: "small", "medium" and "large" instances. In one implementation, the computational power or performance capability of a medium instance may be approximately twice that of a small instance, and the computational power of a large instance may be approximately twice that of a medium instance. The relative computational power of the different capacity levels may be estimated by the provide network operator based on the number and type of hardware resources (e.g., processor cores) that may be allocated to or dedicated to each virtual compute instance. If a computer server "Q" with 16 cores with a certain clock speed "X" were used as the underlying hardware for the various instance sizes, in one example implementation, and a small instance were configured to use up to four of the cores, a medium instance could be configured to use up to eight of the cores, and a large instance could be configured to use up to all sixteen cores. The number of cores allocated to a virtual compute instance may be controlled by settings in the virtualization software in some embodiments. The provider network vendor could populate an entire data center (or multiple data centers) with the 16-core "Q" servers, and support various combinations of small, medium and large virtual compute instances with just one underlying server type, without any of the pricing and support-related complexity of managing different types of servers. It is noted that the three capacity levels in this example may differ from each other not only in the number of processor cores, but also in other characteristics such as main memory size, disk space, software versions and the like in some embodiments. For example, if a 16-core "Q" server has 16 gigabytes of physical memory, in one implementation a small instance may be allowed to use at most four gigabytes, a medium instance may be limited to eight gigabytes, and a large instance to sixteen gigabytes.

Continuing with the simple example scenario of the small, medium and large reservable capacity levels, a client may have to select one of the levels for a given reservation, as well as the term or duration of the reservation, and in some cases an uptime ratio which may also impact the cost of the reservation in some embodiments. A client may choose a particular capacity level or instance size based on a number of factors. For example, in some cases a client may decide on a desired capacity level based on results performance testing done using one or more compute instances, either at a client data center or using the provider network resources. The client may also take into account estimates of the current and projected workload levels that the reserved instance may need to support, as well as various other considerations such as available budgets, the client's own product delivery schedules, and the like. In some embodiments, as noted above, the client may have to choose not only the instance size and the reservation duration, but also the uptime ratio or utilization level. Based on some combination of these various factors, the client may for example decide to reserve a medium instance at a medium uptime ratio level for a three-year period. As a result, the client may in effect be locked in to paying for three years for the use of the medium instance, in accordance with the specifics of the pricing plan of the reservation.

However, during the term of the reservation, some of the circumstances that led to the decision to select the medium instance for three years at a medium uptime level may change. For example, the workload projections used by the client in selecting the medium instance may turn out to be too high (or too low) compared to the actual workload. A new version of one or more of the applications that the client wishes to run on the instance may have become available, which may have higher (or lower) CPU, memory or storage requirements. Or, the client may wish to run some other applications that have become available since the original reservation was made; such applications may have different resource usage characteristics than the original applications targeted for the instance. In short, for any of a number of reasons, a client may wish to change one or more of the properties of the existing reservation: the capacity level, the reservation duration, and/or the uptime ratio. At the same time, the client may wish to retain some of the advantages of making long-term reservations—e.g., the lower usage-based costs compared to on-demand instances, for example. From the perspective of the provider network operator, especially in view of a goal to maintain high client satisfaction levels, it may be beneficial to make the kinds of changes (e.g., a change from a medium to a large instance) that the client desires, as long as sufficient resources are available. The provider network operator may also, however, wish to ensure that it is compensated, at least to some extent, for reserving or setting aside the original resource capacity for the client, and may also wish to charge the client an appropriate price for the flexibility of changing various reservation properties.

According to some embodiments, therefore, the resource manager may support one or more types of reservation modifications requested by clients. In one type of reservation modification request, a client that has an existing reservation for an original resource capacity and an original reservation duration may request a modified resource capacity. In response to such a request, the resource manager may identify one or more resources to provide the modified resource capacity. For example, if the client wishes to modify a reservation for a currently active medium compute instance to a large instance, the resource manager may have to determine whether the hardware platform that is currently being used for the client's medium instance has enough spare capacity to accommodate a large instance, or whether some different hardware platform is needed. Even in the case where the client's original reserved instance is not active, or when the client wished to obtain a smaller instanced than the original instance, in some cases the resource manager may have to determine whether sufficient resources are available to modify the reservation.

Having identified the resources to be used for the modified capacity level, the resource manager may identify one or more pricing components or line items that the client should be billed for the requested modification. Any combination of a number of different factors may be taken into account to determine the pricing components in different embodiments. For example, in one embodiment a pricing component may be determined based at least in part on the difference between the modified resource capacity and the original resource capacity. If the client wishes to reserve a large instance instead of a medium instance, there may be a charge for the upgrade in such an embodiment. The price for changing reservation capacity may also be based at least partly on the length of the remaining portion of the original reservation duration in some embodiments. For example, the resource manager may use a model derived from any appropriate financial pricing model or options pricing model to estimate the value of the remaining term of the existing reservation and/or the value of the change in capacity, and use such estimates to determine one or more pricing components. In embodiments where changes to the reservation duration are supported, the difference between the original reservation duration and the requested changed duration may also contribute towards a pricing component. Similarly, if the client wishes to modify the uptime ratio of the reservation, the difference between the modified uptime ratio and the original uptime ratio may be reflected in the pricing for the modified reservation. The original reservation may be modified in accordance with the client's request, and the resource manager may provide a response to the client indicating that the reservation has been modified as requested, and/or indicating the pricing components for making the changes. Clients may be informed about the pricing factors that may be taken into account if and when reservations are modified in some embodiments; e.g., a reservation modification pricing policy may be made available, either when the original reservation is made or via a web-site accessible to clients. In at least one embodiment, before a reservation change is implemented, the client may be provided an estimate of the cost of making the change, so that for example the client has the opportunity to consider the impact of the contemplated change and to potentially withdraw the request.

As noted above, a change to any combination of at least the following factors may be requested by the client in some embodiments: capacity levels, reservation duration, and uptime ratio. With respect to capacity level changes, several different options may be available to a client, for capacity upgrades as well as capacity downgrades. As described above, in some embodiments a number of different reservable capacity levels may be supported, such as large, medium and small instances. In some cases the same underlying hardware platform may be configurable as instances of different capacities, as in the example of the "Q" servers mentioned above, where a given "Q" server could be configured as one large instance, or two medium instances, or four small instances. Thus, at least in some implementations where the same underlying resource can be configured into different combinations of instances, some requested reservation changes could result in equivalent underlying resource capacity being used. For example, a change from a large instance using a "Q" server to two medium instances (or vice versa) may result in no net change in underlying resource use. Such changes may be termed "equivalent-capacity" changes herein. A request to change a reservation for two small instances to one medium instance may represent an "equivalent-capacity" upgrade request, and a request to change a reservation for one large instance to one medium instance and two small instances may represent an "equivalent-capacity" downgrade request. It is noted that equivalent-capacity upgrades and/or downgrades may be supported using different types of underlying computing devices or servers in some embodiments—that is, the resource manager may classify a change from one capacity level A to another capacity level B as being equivalent even if the underlying hardware resources used for A and B are different servers, potentially with different clock rates, different numbers of cores, or different vendors. In addition to equivalent-capacity upgrades, the resource manager may in some embodiments accept requests for "increased-capacity" upgrades—e.g., a request to change a medium instance reservation to a large instance. Similarly, in some embodiments "decreased-capacity" downgrades may be supported, such as requests to change a reservation for a large instance to a small instance.

In one embodiment, the resource manager may implement a reservation resale marketplace, where resource reservations made for a given client may, at the given client's request, be made available for purchase by other clients. In such a scenario, a client that no longer wishes to use a reserved instance may request the resource manager to resell the reservation for a specified price (which may depend on the remaining duration of the reservation) or for a best-possible price. When a client wishes to modify an existing reservation to a reservation for a smaller instance (i.e., the client desires a decreased-capacity downgrade), in some embodiments the resource manager may accept requests to combine the reservation modification with a resale of the no-longer-needed capacity. For example, if the client has an existing reservation for a large instance and now wishes to downgrade to a medium instance, the resource manager may be willing to place the freed-up capacity for resale in the marketplace, e.g., either as two small instances or as one medium instance (assuming equivalence between a large instance, two medium instances, and four small instances as described in the "Q" server example discussed above). Such a downgrade request bundled with a resale request may be referred to herein as a "decreased-capacity-with-resale" downgrade request herein. Thus, at least three types of downgrade requests may be supported in some embodiments: equivalent-capacity downgrades, decrease-capacity downgrades, and decreased-capacity-with-resale downgrades. In one embodiment, a resource manager may only be able to resell capacity freed up as a result of a downgrade to the extent that the amount of capacity freed up corresponds to one or more reservable units, and to reservation durations supported by the resource manager. For example, if the resource manager only supports reservations for 1-year or 3-year terms, and a given downgrade request results in feeing up a small instance for ten months, it may not be possible to resell the small instance in such an embodiment because a minimum term of a year is required for any reservation. In other embodiments resold reservation terms may be flexible—i.e., there may be no minimum term requirements for resold reservations, and in the current example a small instance may be resold for up to the ten months left in the original reservation. In another example, the amount of capacity being freed up as result of a downgrade may not match exactly to the units in which capacity is reservable (this may be the case for example when the differences in capacity between the different supported levels is not a multiple of two as in our examples so far), and the resource manager may make a best effort to resell as much of the capacity as can be packaged into the reservable units supported. In some embodiments, upgrade requests could also potentially be combined with resales—e.g., if a client requests a change from a medium instance to a large instance, and that change requires the use of a different hardware platform or resource, the original reservation for the medium instance may be placed on the resale market.

In addition to or instead of capacity level changes, clients may wish to modify reservation durations, and/or uptime ratios in some embodiments. For each type of change requested, the resource manager may determine a corresponding pricing component in some embodiments, and may notify the client of the pricing impact of the requested change. The pricing component for a reservation duration change may, for example, depend at least in part on the extent of the desired change, and/or on the expected demand for the desired capacity. Similarly, the pricing component for a reservation uptime ratio change may depend on the extent of the change (e.g., a request to change from high to low uptime ratio may cost more than a change from medium to low) and/or on supply and demand for the desired capacity. The various pricing components associated with reservation modifications may include fixed or upfront charges (e.g., there may be a fixed charge for the ability to make reservation changes, and another fixed charge for making a requested change), as well as usage-based charges in some embodiments. In some cases, a decreased-capacity downgrade may result in a reduction in the client's overall bill—e.g., even though modifying the reservation may result in a fee, the long term usage-based charges for the downgraded instance capacity level may be substantially lower than the usage-based charges for the original capacity may have been.

In some embodiments, if the instance originally reserved for the client is in use (i.e., low-level applications such as an operating system, or high-level applications running on top of the operating system, are running on the instance), a requested reservation modification may require additional work to ensure that the set of running applications is successfully instantiated on the resources that are selected to provide the modified capacity level. In some embodiments, a migration manager may be responsible for migrating live applications from one platform to another. When the resource manager identifies the resources to be used after the reservation is modified, the migration manager may be informed of the target resources by the resource manager, and the migration manager may activate the applications on the target resources at the request of the resource manager (or at the request of the client). Such a migration may involve several intermediate steps in some implementations, such as saving a state of the original instance or applications, copying elements of the state (such as memory contents) to the target resource(s), and/or restarting the machine image, operating system, applications, or other components at the target resources. In some embodiments, instead of live applications being migrated on behalf of the client, the client may be notified that the applications may need to stopped on the originally-reserved instance and restarted on the instances used after the reservation modification. Clients may also have to stop or restart their applications or instances as part of the reservation modification process for a number of reasons potentially unrelated to live migration support in some embodiments. For example, the resource manager may have run out of spare capacity, so that the same devices that are currently in use for the client may have to be used for the changed reservation (either an upgrade or a downgrade), and configuration changes to the devices may necessitate a restart. In another scenario, even if the resource manager does not necessarily require a restart, the client may have to restart an application in order to take advantage of changed capacity—e.g., when a reservation for a four-gigabyte memory compute instance is changed to a reservation for an eight-gigabyte memory compute instance, the client may restart an application to set the application's maximum heap size from three gigabytes to six gigabytes. In at least some embodiments, clients may modify reservations simply to take advantage of the pricing benefits associated with the change (e.g., an overall lower cost for using two medium instances rather than one large instance), and may not have to stop or restart applications or take any other actions other than requesting the reservation changes.

As noted above, in some embodiments, depending on the type of reservation modification requested, the same underlying hardware platform may be usable after the modification, as was reserved before the modification. In other embodiments, a change to a reservation may result in different hardware being used for the modified reservation. In either case, a change from one capacity level or instance size to another may require one or more configuration changes, e.g., in the virtualization software such as a hypervisor, and/or in operating system settings. Virtualization settings that may be modified may include, for example, the mapping between processor cores and virtual machines (i.e., the maximum number of cores to be used by a given virtual machine representing a compute instance, or the specific cores to be dedicated for use by a given virtual machine). Mappings between memory components and virtual machines (e.g., how much of the main memory of a given server is to be usable by a given virtual machine, or which memory bus is to be used by a given virtual machine), between storage components (disk drives or partitions) and virtual machines, and/or network devices and virtual machines, may also or instead be modified in various embodiments to support different capacity levels.

By supporting reservation modifications of the types described above, a resource manager may be able to provide substantially more flexibility to clients, and may potentially increase the size of the customer base that is willing to commit to longer-term reservations, thus resulting in a more stable revenue stream for the operator of the provider network. In effect, by allowing clients to change reserved capacity levels, the resource manager may allow clients to set up flexible-capacity pools, where the exact configurations of the instances to be used at any given time can be adjusted as needed by the client. While the client may have to pay upgrade/downgrade fees, many of the advantages of long-term reservations such as lower usage-based fees may be retained.

Example System Environment

FIG. 1 illustrates an example system environment, according to at least some embodiments. The system 100 includes a provider network 110 with a plurality of resources 120, such as resources 120A, 120B, 120C, 120D and 120E. The resources 120 may be reserved and/or allocated to clients 148 in units called instances, such as small instances 130 (e.g., 130A, 130B, 130C, and so on), medium instances 132 (e.g., 132A), and large instances 134 (e.g., 134A). It is noted that although only three different instance sizes are shown in the embodiment illustrated in FIG. 1, system 100 may include any desired number of supported instance sizes or reservable capacity units. A given instance 130, 132 or 134 may be implemented using one or more resources 120—e.g., in the case of compute instances implemented using virtual machines, one or more virtual machines with desired performance and capacity may be set up on a given resource 120. In the illustrated example, resource 120A has four small instances 130A, 130B, 130C and 130D, while resource 120B has three small instances 130E, 130F and 130G and a portion of unreserved capacity 140A. Resource 120C is being used for a medium reserved instance 132A and also has two small instances 130K and 130L. resource 120D is being used exclusively for a large instance 134A, while resource 120E has no reserved instances and as a result comprises unreserved capacity 140B. It is noted that although location details are not shown in FIG. 1, the resources 120 of system 100 may in some embodiments be organized into one or more geographical regions, one or more availability zones in each region, and part or all of one or more data centers in each availability zone.

In the illustrated embodiment, system 100 includes a resource manager 180, a migration manager 181, and an interface manager 182. Resource manager 180 may be responsible for responding to resource reservation requests from clients 148 (as indicated by the arrow labeled 185) and also for responding to reservation modification requests (as indicated by the arrow labeled 187). Migration manager 181 may be responsible for migrating instances and/or applications on behalf of resource manager 180 from one resource 120 to another, as indicated by the arrow labeled 189 and as described below in further detail. In some embodiments clients 148 may be allowed to send instance migration requests and/or application migration requests to migration manager 182. Interactions between clients 148 and resource manager 180 (and between clients 148 and migration manager 181 in some implementations) may be accomplished using one or more programmatic interfaces, such as one or more web pages, application programming interfaces (APIs), graphical user interfaces (GUIs), command-line tools and the like, provided by interface manager 182 in some embodiments. In one embodiment, the functionality of interface manager 182 and/or migration manager 181 may be provided by subcomponents of resource manager 180. The resource manager 180 may in some embodiments store various kinds of information related to resource instance reservations and/or usage in a persistent repository such as resource management database 190.

The resource manager 180 may implement instance reservations using reservation slots 193 in some embodiments. Each slot 193 (such as slot 193A) is a logical representation of a reservation set up for a client 148, indicating a commitment to activate a resource instance (e.g., a small, medium or large instance) in response to an activation request from the reserving client. Various types of data may be associated with a given reservation slot 193, such as the level of capacity reserved 194 (e.g., whether the reservation is for a small, medium or large instance), the duration 195 (e.g., start and end date or time) of the reservation, and the uptime ratio 196 or utilization level of the reservation (indicative of a ratio between the length of time the capacity is expected to, or allowed to, be active, relative to the reservation duration 195). Other reservation details may also be maintained for each reservation by resource manager 180 in some embodiments, such as usage records indicating the time periods for which an instance has been active, the specific resources 120 used for the reservation, migration history, pricing history, and so on.

In the illustrated embodiment, resource manager 180 may be responsible for identifying resources to be used to fulfill reservation requests, and for generating reservations for specified instance sizes or capacity levels, durations, and uptime ratios. In addition, as noted above, the resource manager 180 may be configured to respond to modification requests for existing reservations. When a modification request for an existing reservation is received, indicating a desired modified capacity level, the resource manager 180 may be responsible for determining whether resources are available for the requested capacity change. For example, in a scenario where a client 148 has an existing reservation for small instances 130A and 130B, and now wishes to change the reservation to a large instance instead, the resource manager 180 may consider two types of target resources that may be used for the change. If there is currently sufficient unreserved capacity at the resources 120 (resource 120A in this example) already in use for the existing reservation, or sufficient capacity can be freed up at the resource already in use, that same resource may be used for the modified reservation. In the current example, assuming that small instances 130C and 130D cannot be moved or migrated, there is insufficient capacity at the currently in-use resource 120A. Therefore, the resource manager 180 may search for unreserved capacity sufficient for the change—in this case, for example, unreserved capacity 140E at resource 120E may be sufficient for the large instance desired by the client 148. For capacity downgrades (requests for smaller instances than currently reserved), in several embodiments the same resources that are currently reserved may be identified by the resource manager 180 to implement the desired change.

Having identified the resources 120 to provide the modified capacity requested by client 148, the resource manager 180 may determine one or more pricing components to be billed to the client for modification of the existing reservation. The pricing components may be based at least in part on (a) a difference between the modified resource capacity and the original resource capacity and/or (b) a remaining portion of the original reservation duration. For example, the resource manager 180 may use a model derived from any appropriate financial pricing model or options pricing model (such as a Black-Scholes model) to estimate the value of the remaining term of the existing reservation, and use such estimates to determine one or more pricing components. In embodiments where changes to the reservation duration 195 are supported, the difference between the original reservation duration and the requested changed duration may also contribute towards a pricing component. Similarly, if the client 148 requests a change to the uptime ratio of the reservation, the difference between the requested uptime ratio and the original uptime ratio may be used to determine an element of the price. After determining the various price components, resource manager 180 may modify the original reservation as requested, and may provide a response to the client 148 indicating that the reservation has been modified, and/or indicating the pricing components for making the changes. Pricing components for the reservation change may include fixed or upfront fees, as well as usage-based fees in some embodiments.

In some embodiments, the resource manager 180 may support one or more sets of reservable capacity units (such as the small, medium and large instances shown in FIG. 1), which may be organized into "instance families" as described in further detail below in reference to FIG. 2. In some such embodiments, upgrades and downgrades may be supported only within a given instance family—i.e., a reservation for one instance type may only be upgraded (changed to a higher capacity or performance level) or downgraded (changed to a lower capacity or performance level) to a reservation for another instance type within the same family. In other embodiments, reservation modifications may be permitted across instance family boundaries. In some embodiments, location-related restrictions may be implemented for reservation changes—e.g., one reservation at a particular data center or availability zone may only be modified to use resources at that same data center or availability zone.

As noted above, in some embodiments a request for a capacity downgrade (or an upgrade) may be combined with a request by the client 148 to resell any capacity freed up as a result of the requested change. In such embodiments, the resource manager 180 may place some or all of the originally-reserved instances on a reservation resale marketplace, allowing other clients 148 to purchase the reservations. Various types of pricing policies may be implemented for the resale, such as a fixed price suggested by the client or determined by the resource manager 180, or a time-varying price (e.g., a price that is lowered as the remainder of the original reservation duration gets shorter).

In some embodiments, one or more instances corresponding to the existing reservations may be active or in use when the client 148 requests the reservation modification. For example, one or more client applications may be running on the currently-reserved instance, and the client 148 may want to continue the execution of the applications with as little interruption as possible. The term "application" as used herein, refers broadly to executable software entities at various levels of the software stack, from low-level operating system code to higher level programs such as application servers, web applications and the like that may run on top of the lower level code. In some embodiments, live migration of instances and/or applications may be supported, e.g., with the help of migration manager 181. In a live migration, a running application at an instance I1 may be moved to a different instance I2 within a very short time, short enough in some cases that the users of the applications may not notice the move. In some embodiments, in response to a determination by the resource manager 180 to modify the original reservation in accordance with the reservation modification request received from a client 148, the migration manager 181 may activate one or more applications that were running on the original reserved instances to one or more resources identified to provide the modified resource capacity. In some implementations a migration fee may be associated with such live migrations. In at least some embodiments, live migrations may not be supported for at least some types of applications, and a client 148 may be notified that application or instance restart may be required in conjunction with a reservation change.

Instance Families

In some embodiments, as noted above, a provider network 110 may support a set of "instance families" representing groups of resource capacity units. Some instance families may be intended for general use, i.e., for clients 148 that run commonly-used applications; other instance families may be supported for specialized use, such as for high-memory applications, high-CPU applications, clustered applications, parallel applications or the like. FIG. 2 illustrates an example of a set of instance families that may be supported in a provider network, according to at least some embodiments. Four instance families are shown: standard instance family 210, high-memory instance family 240, high-CPU instance family 250, and a special-purpose instance family 260. Instance types may differ from one another in various characteristics, such as compute capacity, memory capacity, storage capacity, networking capacity, operating system version or address sizes (e.g., 32-bit vs. 64-bit addresses), and the like. In FIG. 2, instance types are shown as having differing compute capacity (expressed in units called "C"), memory capacity (expressed in units called "M"), and storage capacity (expressed in units called "S"); other differences between instance types are not shown for clarity.

Instance types may be grouped into instance families to help clients select the resources most appropriate to their use cases. As their names imply, for example, high-memory instances may be appropriate for clients 148 that know that their applications have high memory requirements (relative to computing or storage requirements), and high-CPU instances may be appropriate for clients 148 whose applications are more compute intensive. In some embodiments, the different instance types of a given instance family may be implemented using a small set of different hardware server types (even a single server type may suffice for all the instance types of a given family in some cases). For example, in the illustrated embodiment, the various instance types (small, medium, large and extra large) of the standard instance family 210 may be implementable using a single server type "S1" with 32 processing cores, 64 gigabytes of available main memory and 1600 gigabytes of available disk storage. The names of the different instance types may each comprise two elements: a "machine type" such as "m1" concatenated with a size designation string ("small", "medium", "large", and "xlarge" in this example). Thus, the four instance types of the standard instance family 201 are named m1.small, m1.medium, m1.large, and m1.xlarge in the illustrated example. The relative compute capacities of the four instance types are in the ratio 1:2:4:8. If an m1.xlarge instance 236 is allowed to use all 32 cores of an S1 server, an m1.large instance 134 may be allowed to use up to 16 cores, an m1.medium instance 132 may use up to 8 cores, and an m1.small instance 130 may use up to 4 cores. Similarly, if an m1.xlarge instance 236 is allowed to use all 64 gigabytes of main memory, the maximum memory usable by instance types m1.large, m1.medium and m1.small may be set to 32 gigabytes, 16 gigabytes, and 8 gigabytes respectively. Storage capacity limits for the different instance types may be set in the same ratio: all 1600 gigabytes for m1.xlarge instances, 800 gigabytes for m1.large instances, 400 gigabytes for m1.medium instances and 200 gigabytes for m1.small instances.

The limitations on processor core usage, memory usage, storage usage, as well a other limitations such as networking limits and the like may be controlled using settings or parameters of virtualization software (e.g., hypervisors) or other low-level software used to implement the different instance types in some embodiments. Thus, by changing virtualization settings on a given S1 server, it may be possible to set up eight small instances, four medium instances, two large instances, one extra-large instance, or various combinations of small, medium and large instances (e.g., one large instance, one medium instance and two small instances). The fact that the capacity of each larger instance type in the standard family can potentially be divided up to form integral numbers of smaller instances may be helpful in providing the support for reservation modifications. A reservation for an m1.xlarge instance 236, for example, may use equivalent capacity to eight m1.small instances, or to a combination of (one m1.large, two m1.medium) instances, or to a combination of (two m1.medium, four m1.small) instances, and so on. Although a single server type S1 is mentioned above, in some embodiments the various capacity levels of a given instance family may be implemented using several different server types, and there is no requirement that the number of cores or other resources used for the different capacity levels of an instance family be integral multiples of each other.

In the illustrated example, clients 148 with memory-intensive applications may choose from among the m2.xlarge and m2.2xlarge instance types of the high-memory instance family 240, if they so desire. The instance types of the high-memory family may have large main memory limits, relative to their computation-related limits, than the instances of the standard instance family; once again, in some implementations a small set of server types may be used to implement all the instance types of the high-memory instance family, thereby facilitating possible replacement of an m2.2xlarge instance by two m2.xlarge instances using virtualization settings changes. Similarly, instance types of the high-CPU instance family 250 may have relatively high compute limits, and may be implemented using a small set of server types so that for example an m3.2xlarge instance can be replaced by two m3.xlarge instances that together use the same underlying hardware as the single m3.2xlarge instance did.

Figure 2:
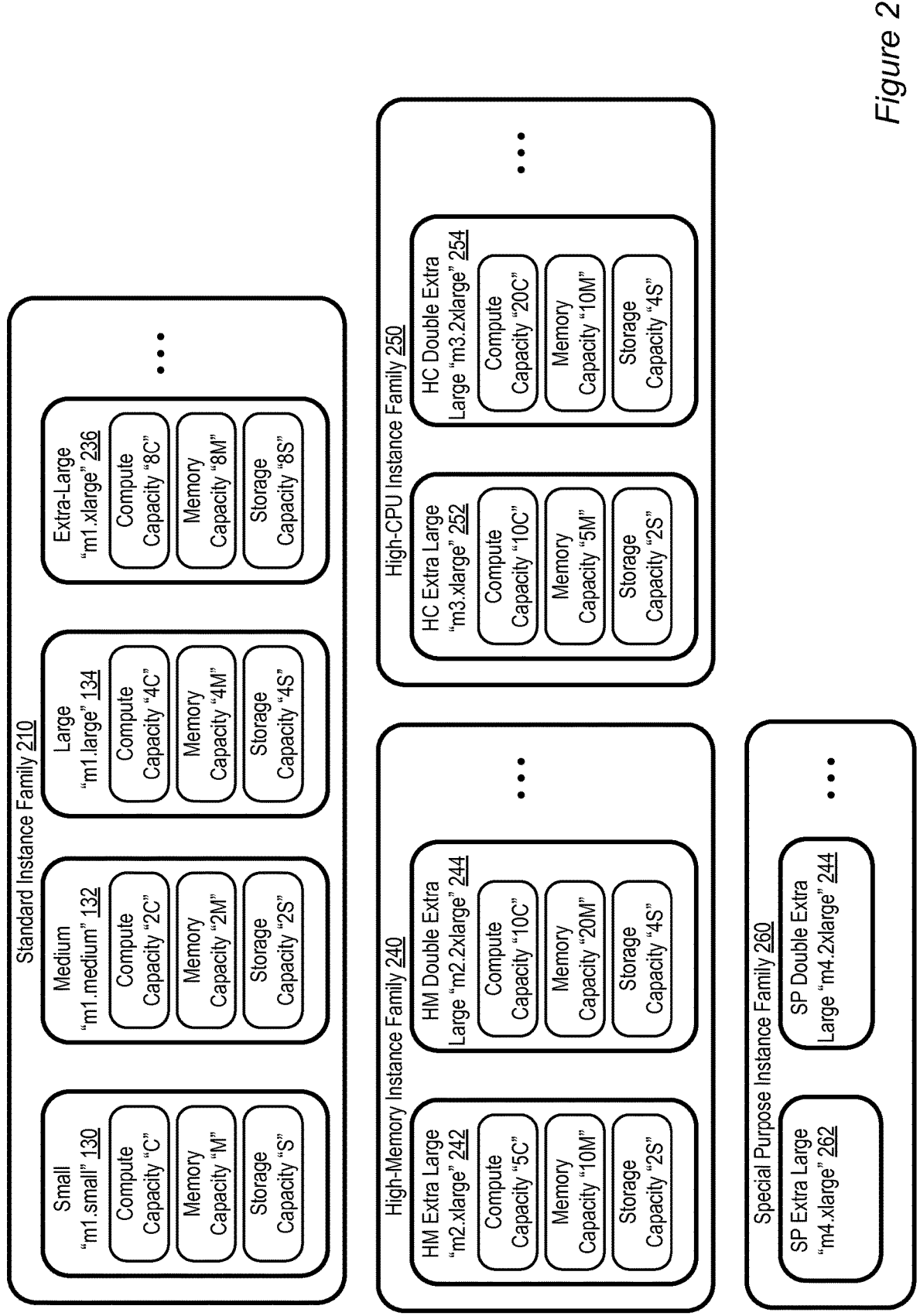
FIG. 2 illustrates an example of a set of instance families that may be supported in a provider network, according to at least some embodiments.

In some embodiments, one or more special-purpose instance families 260 may be implemented, in addition to instead of the standard, high-memory and high-CPU instance families shown in FIG. 2. Each such special purpose instance family may comprise a plurality of instance types best suited for the corresponding special purpose—e.g., a graphics-oriented instance family may include instance types optimized for graphics or rendering performance, a floating-point instance family may be optimized for high-end floating point operations, a clustering instance family may be optimized for large clustered applications, and so on. In some environments a single server type may be used to implement instance types of several different instance families.

In some embodiments, reservation changes may be allowed only within a given instance family—e.g., a client 148 that has a current reservation for an instance type of the standard instance family may only be allowed to change the reservation capacity to another capacity level of the standard instance family. Such restrictions may, for example, simplify the work of the resource manager, especially in scenarios where a limited set of server types and/or virtualization settings need to be managed to implement the desired reservation changes. In other embodiments, reservations for a capacity level corresponding to one instance family may also be modifiable to capacity levels of other instance families.

Interactions Between the Resource Manager and Clients

Figure 3:
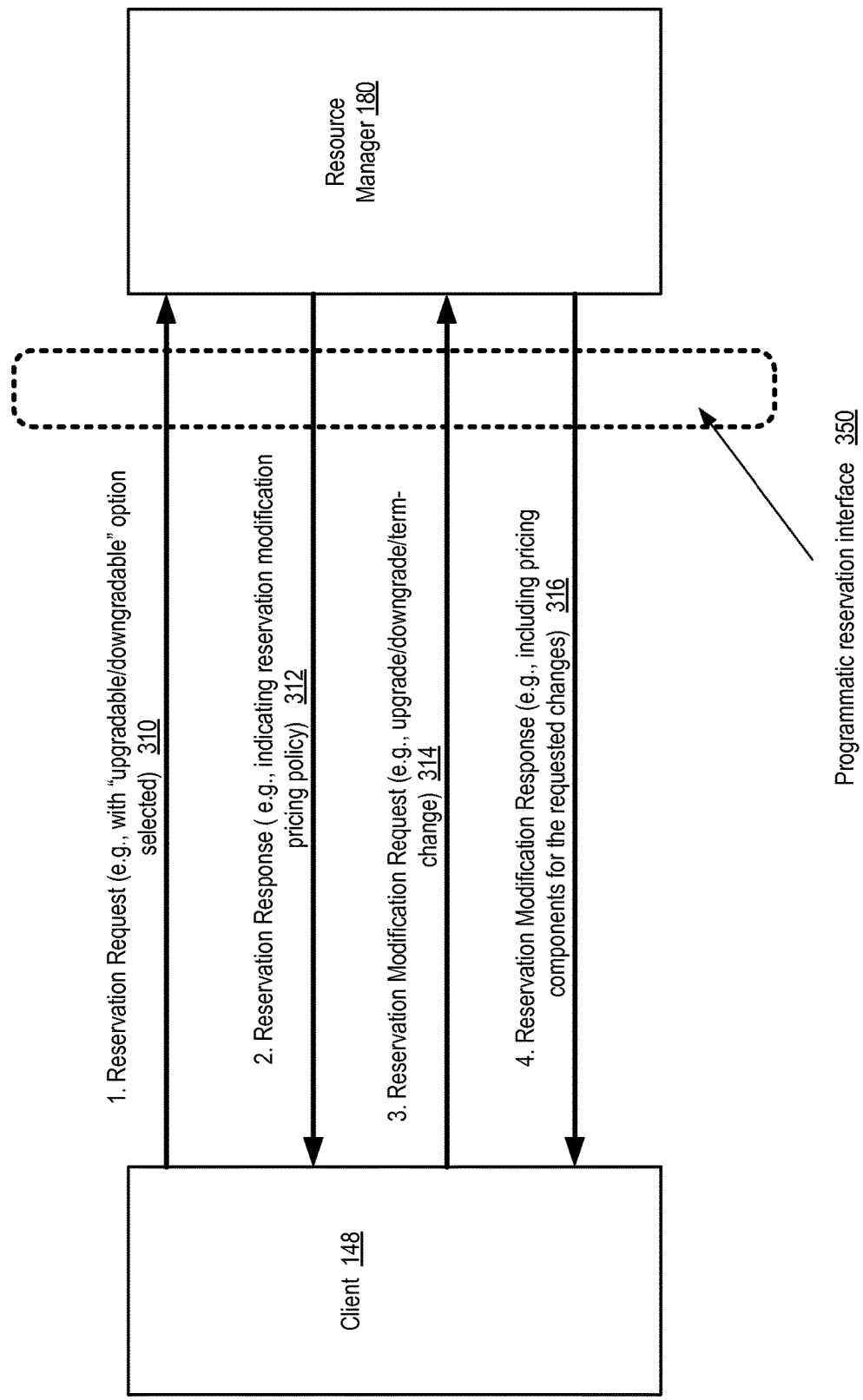
FIG. 3 illustrates examples of reservation-related interactions between a client and a resource manager, according to at least some embodiments.

FIG. 3 illustrates examples of reservation-related interactions between a client 148 and a resource manager 180, according to at least some embodiments. As noted earlier, in some embodiments an interface manager 182 (which may be implemented as an entity external to the resource manager 180, or as a subcomponent of the resource manager 180) may provide one or more programmatic interfaces such as interface 350 usable by clients to interact with the resource manager 180 to make and modify reservations. An interface 350 may allow a client to obtain information on the factors that could influence pricing of reservation modifications in some embodiments—e.g., a web site with a reservation modification pricing plan or policy could be provided. As shown by the arrow labeled "1" in FIG. 3, a client 148 may submit a reservation request to the resource manager 180, specifying for example an instance type (or capacity level), a reservation duration, and in some cases an uptime ratio. In some implementations the reservation request may include an indication from the client 148 that the client would like to opt for reservation flexibility—e.g., the option to upgrade/downgrade the capacity level, the duration and/or the uptime ratio at a time of the client's choosing. The interface 350 may in some cases allow the client 148 to determine the cost or pricing (if any) associated with the reservation modification capability. It is noted that there may be separate pricing or billing components for the ability of the client to make a flexible reservation on the one hand, and the actual modification of an existing reservation on the other hand. Various other client preferences, such as location (e.g., availability zone or region) preferences and the like may also be specified in the reservation request in some embodiments. In response to the initial reservation request, the resource manager 180 may find the desired resources, generate a reservation (e.g., by allocating a slot 193 to the client 148), and transmit a reservation response to the client 148, as indicated by the arrow labeled "2" in FIG. 3. The response may use the same interface (e.g., a web-based interface) or a different interface that was used for the reservation request in some embodiments, and may use a different interface in other embodiments. In some embodiments the client may be notified of the pricing policy for reservation modifications as part of the reservation response.

After the initial reservation is confirmed, the client 148 may at some later time wish to modify the reservation, e.g., as a result of changed resource requirements, changed budgets or the like. In such a scenario, the client 148 may send a reservation modification request to the resource manager 180, as indicated by the arrow labeled "3" in FIG. 3. The modification request may include the details of the desired changes, e.g., the desired change in reserved capacity level or instance type, the desired change in reservation duration, or the desired change in uptime ratio. In addition, in some implementations the modification request may include an indication of whether the client 148 wants any freed-up capacity to be resold in a reserved instance resale marketplace. The modification request may also be sent using one of the programmatic interfaces implemented by the interface manager 182 in one embodiment. In one embodiment, a client 148 may be provided an estimate of the cost of making a reservation change—e.g., the client may in effect ask the resource manager 180 the equivalent of "What would it cost to make this reservation change?", and be provided an estimate before the change is requested or implemented. In response to the modification request, the resource manager 180 may identify the resources that can be used to implement the desired change, and determine the various pricing elements or components that are to be billed to the client 148 for the requested changes. For example, as indicated earlier, some of the pricing components may be dependent on the remainder of the term of the existing reservation, others may depend on the extent of the change requested, and so on. In some embodiments, the reservation modification request may indicate that the client 148 wants its running applications or running instances to be migrated to the resources to be used for the requested changed reservation, and the resource manager 180 may coordinate the migration of the applications or the instances before providing a modification response to the client as indicated by the arrow labeled "4" in FIG. 3.

Of course, if the resource manager 180 cannot find the desired resources, either for the initial reservation request or for the modification, the resource manager 180 may respond to the client with a message indicating that the requested action cannot be taken. In some embodiments the operator of the provider network 110 may attempt to minimize the number of times the client's requests are denied in this fashion, so as to keep client satisfaction levels as high as possible. In order to reduce the chances of rejection of client requests, various buffers of unused or unreserved resource capacity may be maintained in some embodiments.

In some embodiments, the pricing components that the client has to pay for reservation modifications may vary dynamically over time—e.g., when there is a lot of unused capacity in the provider network, upgrades may cost less than in times when most of the capacity is already reserved. In some embodiments an interface 350 may allow a client 148 to view the anticipated cost of making a reservation change, so that the client is able to estimate billing changes that might result from an upgrade, downgrade, reservation duration change, or uptime ratio change. In at least one embodiment, a client 148 may include a bid with a reservation modification request, indicating the maximum amount that the client is willing to pay for a requested modification. If the resource manager 180 determines that the bid is sufficient, the requested changes may be implemented in such an embodiment. If the bid is found to be insufficient, the resource manager 180 may either simply reject the bid, or provide some guidance to the client 148 as to how high the bid should be for the modification request to be accepted. The client may then respond with a modified bid sufficient for the requested modification.

Capacity Upgrade and Downgrade Requests

Figure 4:
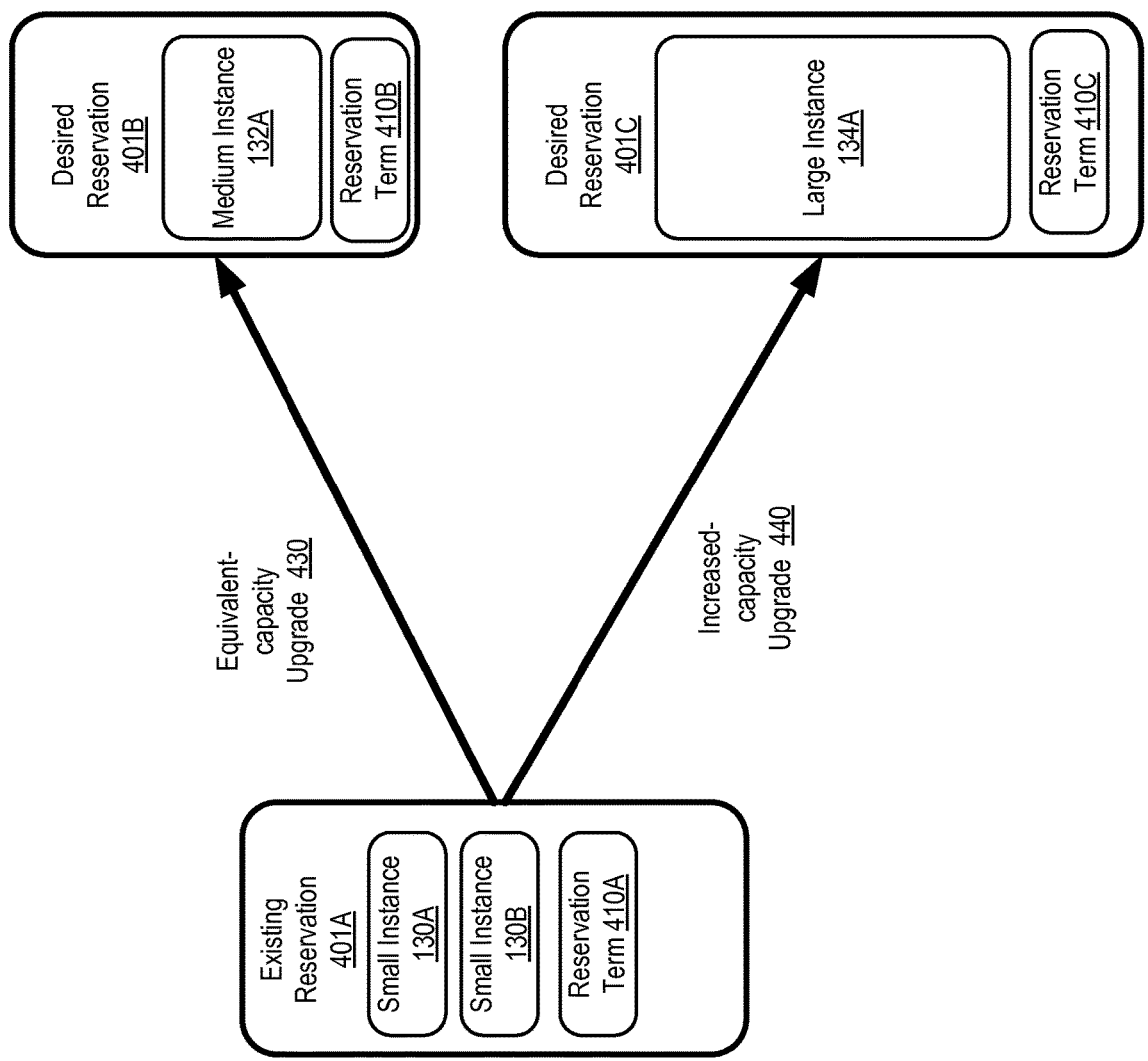
FIG. 4 illustrates examples of types of capacity upgrade requests that may be supported at least in some embodiments.
Figure 5:
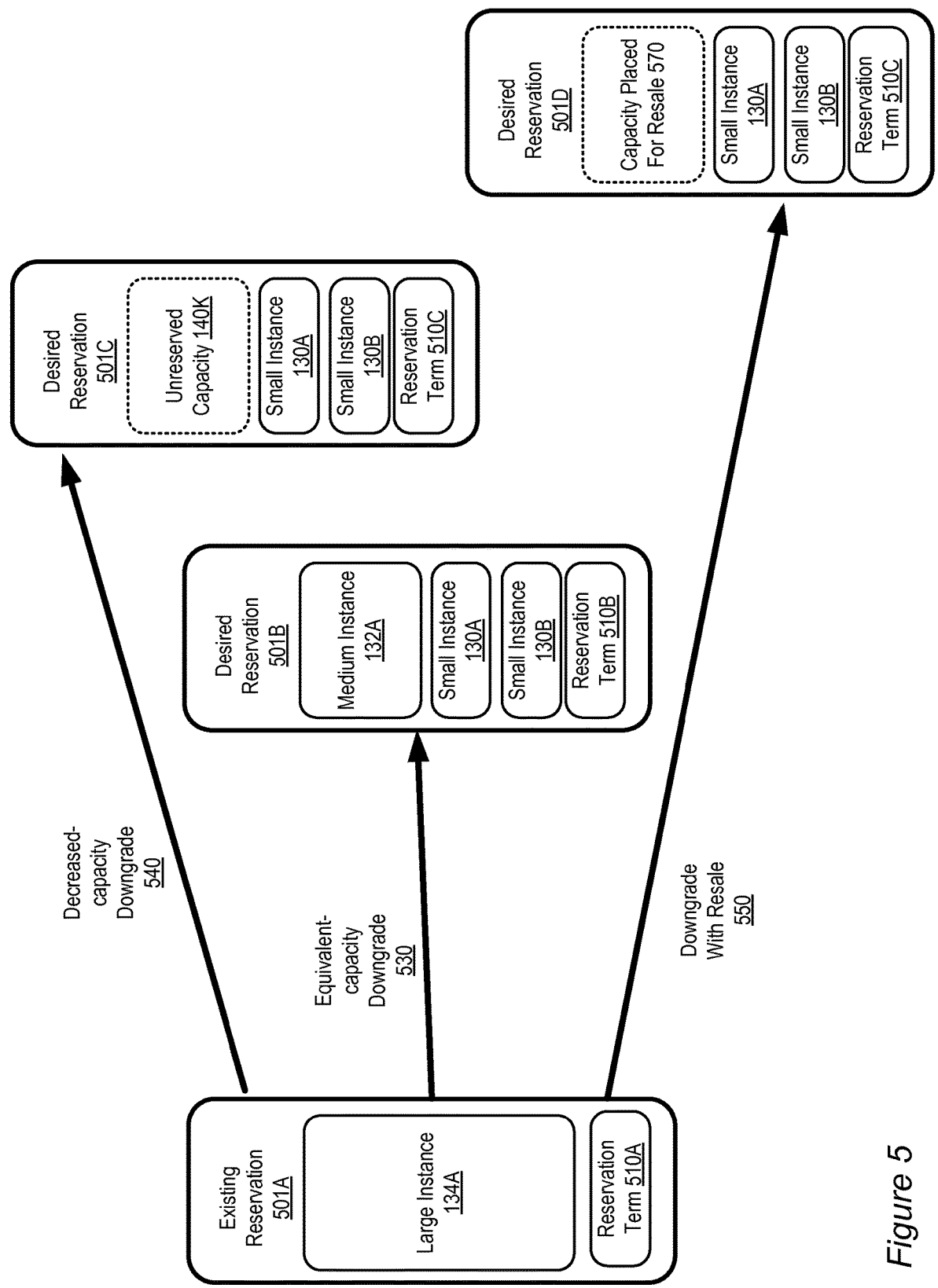
FIG. 5 illustrates examples of capacity downgrade requests supported at least in some embodiments.

FIG. 4 illustrates examples of types of capacity upgrade requests that may be supported at least in some embodiments, and FIG. 5 illustrates examples of capacity downgrade requests supported at least in some embodiments. In the embodiment illustrated in FIG. 4, a client 148 has an existing reservation 401A for two small instances 130A and 130B, with an existing reservation term or duration 410A. Two types of possible capacity upgrade request types are supported in the embodiment shown: equivalent-capacity upgrade 430 and an increased-capacity upgrade request type 440. (For the purposes of the examples shown in FIGS. 4 and 5, the relative compute, memory and storage capacities of small, medium and large instances are in the ratio 1:2:4, so that for example a large instance uses the same total capacity as two medium instances or four small instances.)

An equivalent-capacity upgraded request may require the same total capacity for the changed reservation as was used for the original reservation 401A. Thus, in the depicted example, the two small instances 130A and 130B may be substituted by the single medium instance 132A of the desired reservation 401B. The medium instance 132A may comprise a virtual machine that utilizes the same underlying hardware devices that were used for the original instances 130A and 130B, or the medium instance 132B may use entirely different devices, depending on the resources selected for the changed reservation by the resource manager 180. In contrast to the equivalent-capacity upgrade request 430, an increased-capacity upgrade request 440 may result in the use of larger total capacity than was used for the original reservation 401A. In the depicted example, the client has requested a large instance, which requires more capacity than could be obtained by combining the capacity used for small instances 130A and 130B. Again, depending on the underlying resources being used for the existing reservation 401A and currently unreserved capacity at those resources, the resource manager may use either the same resources or different resources for the upgraded reservation. In addition to the change in reserved capacity, a client 148 may also request a change in the reservation term 410A, e.g., to a different reservation term 410B or 410C.

The costs to the client for the different types of reservation upgrades may differ for the different upgrade types in some embodiments. For example, since the same total capacity is being used for an equivalent-capacity upgrade as for the existing reservation 401A, in some embodiments a client may be charged less for an equivalent-capacity upgrade than for an increased-capacity upgrade. In one implementation, equivalent-capacity upgrades may incur no fee at all, or a very small fee. Of course, additional charges may be accrued for reservation term changes and/or for uptime ratio changes (not shown in FIG. 4).

FIG. 5 shows examples of three types of supported downgrade requests: equivalent-capacity downgrades 530, decreased-capacity downgrades 540, and downgrades with resale 550. In this example, a client 148 has an existing reservation 501A for a large instance 134A with a reservation term 510A, and wishes to change the reservation. In the decreased-capacity downgrade 540, the client requests that two small instances be reserved instead of the currently-reserved large instance. If the resource manager 180 determines that the decreased-capacity downgrade request is to be accepted, and the same underlying resource is to be sued as was being used for the large instance 134A, small instances 130A and 130B may be set up and reserved for the client. In the illustrated example, the remaining capacity freed up as result of the change may be designated as unreserved capacity 140K.

In the case of an equivalent-capacity downgrade 530, the single large reserved instance 134A may be replaced by one medium instance 132A and two small instances 130A and 130B in the modified reservation 501B. In the case of the downgrade-with-resale 550, the resource manager 180 may place the freed-up capacity for resale in a reserved instance resale marketplace (as indicated by the capacity placed for resale 570), so that other clients may be enabled to purchase the freed-up capacity as described earlier. The resource manager 180 may package the resold capacity as one medium instance in this example, or as two small instances, or may allow client purchase requests to determine the units in which the capacity is to be resold. In some embodiments, capacity-upgrade request may also be combined with re-sales—e.g., if a medium instance is being upgraded to a large instance, which may be instantiated using different resources, the originally-reserved medium instance may be placed for resale. As in the case of the various types of upgrade requests shown in FIG. 4, different charges may be applied for the different types of capacity downgrade requests shown in FIG. 5 in some embodiments. For example, clients may have to pay more for the downgrade-with-resale option than for an equivalent-capacity downgrade. In some embodiments, in the decreased-capacity downgrade scenario (without resale), the client may have to continue paying for at least a portion of the unused capacity that is freed up as a result of the downgrade, for the remaining duration of the original reservation.

Methods for Managing Flexible Capacity Reservations

Figure 6:
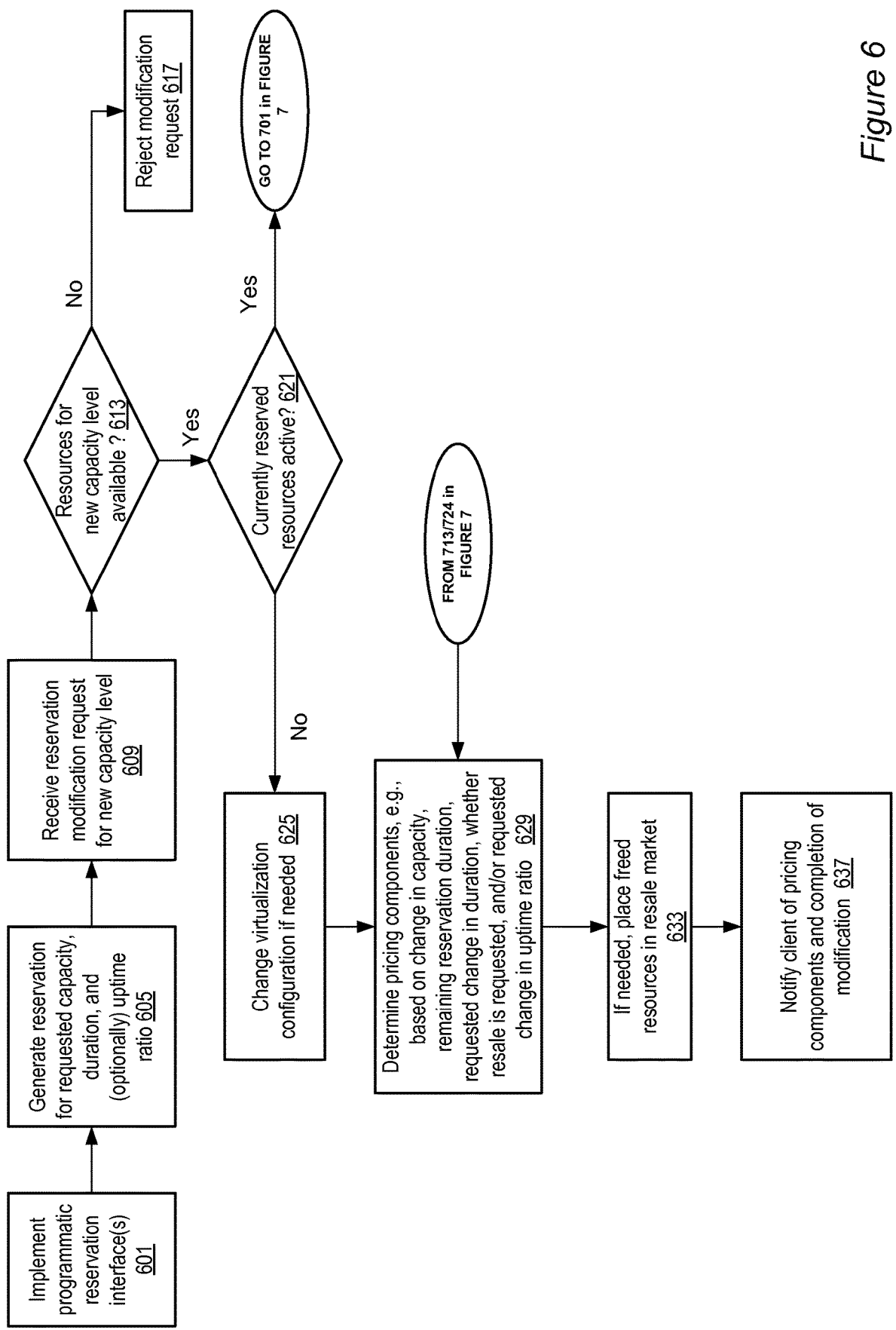
FIG. 6 is a flow diagram illustrating aspects of the functionality of a resource manager dealing with resource reservation modification requests, according to at least some embodiments.

FIG. 6 is a flow diagram illustrating aspects of the functionality of a resource manager, dealing with resource reservation modification requests, according to at least some embodiments. As shown in element 601 of FIG. 6, one or more programmatic interfaces may be implemented for reservation-related interactions, e.g., by an interface manager subcomponent of the resource manager 180, or by an independent interface manager 182. In response to a reservation request received via a programmatic interface, the resource manager 180 may generate or create an initial reservation for a specified resource capacity and reservation duration (element 605). In some implementations, the reservation may have an associated uptime ratio property or setting that may influence the cost of the reservation to the client—e.g., either an upfront portion of the reservation price, or the ongoing usage-based portion of the reservation cost may be affected by the selected uptime ratio setting. In some implementations, the resource manager 180 may use a representation similar to the reservation slots 193 shown in FIG. 1 to manage reservations.

After the initial reservation for a client 148 is set up, at some point the client may submit a reservation modification request indicating a desired modified capacity level for the reservation (element 609). Modifications to other aspects of the original reservation, such as the reservation duration and/or an uptime ratio setting of the reservation may also be included in the modification request in some embodiments. In one embodiment clients may submit reservation modification requests to change reservation duration and/or uptime ratio, without requesting a change in reserved capacity. In response to a modification request for a change in reserved capacity, the resource manager may attempt to find resources to provide the modified capacity. For example, depending on the specifics of the implementation and the nature of the requested change, the resource manager 180 may try to determine whether any resources currently being used for the existing reservation can be re-used for the modified capacity, whether different resources configured for the same instance family should be used, and so on. If resources for the changed capacity level cannot be found (as determined in element 613), the modification request could be rejected (element 617) and the client may be notified of the rejection.

If resources for the desired capacity level can be found (as also determined in element 613), the resource manager 180 may determine whether any resources being used for the existing resource are currently active (e.g., if either an instance is merely running or booted up without any user-level applications executing, or whether one or more applications are currently running on a booted-up instance). In the case where resources for the existing reservation happen to be in use (as detected in element 621), the resource manager may perform one or more operations illustrated in FIG. 7, as described below. If there are no running instances corresponding to the existing reservation (as also determined in element 621), the resource manager 180 may perform any configuration changes needed for the changed capacity (element 625), including for example changes at the virtualization software layer that is used to implement various types of supported instances. The changes made may include, for example, tearing down existing virtual machines, setting up new virtual machines, new mappings or associations between processors/cores and virtual machines, memory and virtual machines, storage devices and virtual machines, network devices and virtual machines, and the like.

The resource manager may determine various pricing components for which the client is to be billed as a result of the reservation modification (element 629). Various factors may be considered when determining the pricing components in different embodiments. For example, in some embodiments pricing components could be based on the extent of the change in requested capacity: a change from a small instance to a medium instance may cost less than a change from a small instance to a large instance, for example. One or more pricing components may depend at least partly on the remaining length of the original/existing reservation in some embodiments. For example, the resource manager may implement a valuation model to estimate the current value of the remainder of the existing reservation term (and/or the current value of the modified capacity reservation), and may use such estimates to determine one or more pricing component. The techniques used by the resource manager to determine pricing components may be derived from various financial models in some embodiments, such as the Black-Scholes financial market model, or the Black-Scholes-Merton model. Pricing components may also be based on other aspects of the reservation change requested, e.g., whether a change to the reservation duration or uptime ratio is requested, whether capacity freed-up as a result of the reservation change is to be placed for resale on a reserved instance resale marketplace, and so on.

Depending on the nature of the reservation modification and whether the client requested resale of capacity freed up as a result of the reservation change, the resource manager may place freed-up resources on the reserved instance resale marketplace in some embodiments (633). In some cases, the resource manager 180 may have to determine exactly how freed-up capacity is to be packaged for resale—e.g., whether the capacity should be resold as one medium instance or two small instances. In some implementations, for example, the client 148 requesting a resale of freed capacity may be informed about possible alternative packaging approaches, and the client may be able to provide guidance on the units in which the freed capacity should be resold. In other implementations, the resource manager 180 may make a best effort to resell the freed capacity without requiring guidance from the client 148. The client 148 may then be notified that the requested reservation modification has been completed, and may be informed of the pricing components that the client will be billed (element 637).

Figure 7:
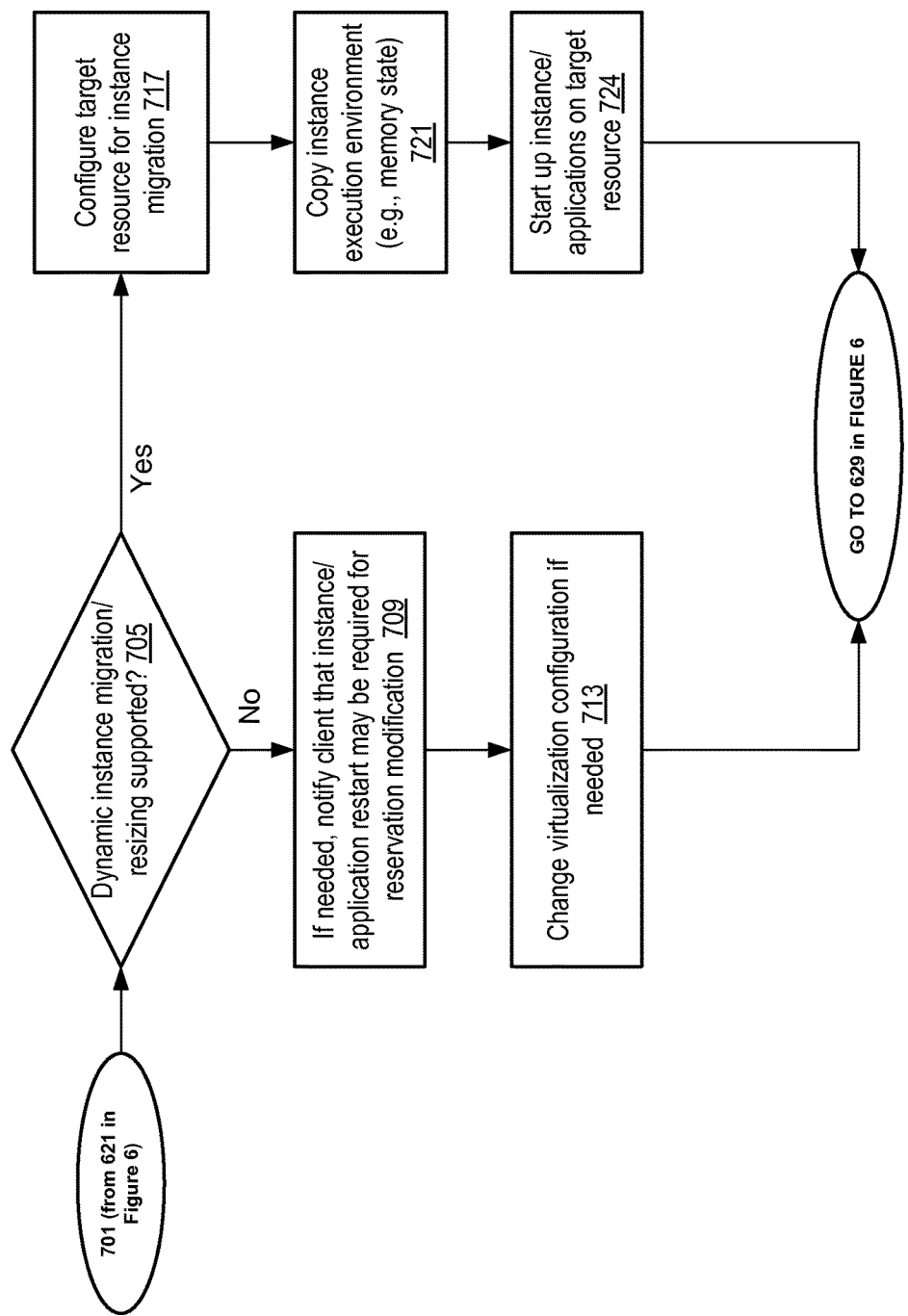
FIG. 7 is a flow diagram illustrating aspects of the functionality of a resource manager related to handling reservation modifications for resources that are currently in use, according to at least some embodiments.

FIG. 7 is a flow diagram illustrating aspects of the functionality of a resource manager related to handling reservation modifications for resources that are currently in use, according to at least some embodiments. Element 701 of FIG. 7 is reached from element 621 of FIG. 6, where the resource manager may determine that one or more resources are in use for an existing reservation for which a modification request has been received from a client 148. In some embodiments the resource manager may determine whether dynamic instance migration or dynamic instance resizing is supported (element 705) for the client. The terms "dynamic instance migration" and "dynamic instance resizing" may refer to functionality allowing the currently running applications (including for example operating-system software as well as higher-level applications) of an instance to continue execution on a different virtual machine, without an interruption that is noticeable by the users of the instance. In some embodiments, dynamic instance migration may be supported for some clients (based on the service agreements in force with the clients) or for some types of applications, and may not be available for all instances and all applications. In some implementations, clients 148 may specify their preferences for dynamic instance migration in their reservation modification requests (or in the original reservation request for the existing reservation). If dynamic instance migration is not supported, in some embodiments the client 148 may be notified that their instance (and/or applications) needs to be restarted as a result of the reservation modification (element 709). In some cases instances or applications may have to be restarted independently of whether dynamic migration is supported—e.g., if the resource manager 180 determines that the same underlying platform is to be used to implement the changed capacity, or if an application requires a restart to make use of the changed capacity. In some scenarios, a client 148 may have to take no actions regarding stoppage or restart—e.g., the client may have simply requested the reservation change to take advantage of pricing benefits, such as a reduced total cost of ownership that may result from using two small instances instead of one large instance. Any configuration changes needed for the modified resource capacity may be performed (element 713) and the operations illustrated in elements 629, 633 and 637 of FIG. 6 (described above) may be performed.

If dynamic instance migration is supported, as also determined in element 705 of FIG. 7, in some embodiments the resource manager 180 (or a migration manager 181) may configure a target resource to provide the requested modified capacity (element 717). The configuration changes needed may be similar to those described above with reference to element 625 of FIG. 6—e.g., virtual machines may be set up or torn down, mappings between various physical resources or components and virtual machines may be established, and so on. In some implementations, the migration manager 181 may be implemented as a subcomponent of the resource manager 180. The migration manager 181 may copy portions or all of the instance execution environment or state (e.g., some or all of the contents of main memory may be copied) from the resources currently being used for the existing reservation to the resources designated for use for the modified reservation (element 721). Applications that were previously running on the instances for the existing reservation may be brought up on the target resources (724), thus providing a transition that may appear seamless to the users of the applications. The operations illustrated in elements 629, 633 and 637 of FIG. 6 (described above) may then be performed, informing the client of the pricing associated with the reservation modification, and notifying the client that the requested modification has been completed.

It is noted that in different embodiments, the operations illustrated in FIGS. 6 and 7 may be performed in an order that is different than that shown in the Figures, and that some operations appearing sequential in the Figures may be performed in parallel. For example, the determination of the pricing components shown in element 629 may be performed before the configuration changes shown in element 625 in some implementations. Similarly, in some embodiments the dynamic instance migration operations shown in elements 717, 721, and 724 may be performed after the operations shown in elements 629, 633 and 637, or in parallel with the operations shown in elements 629, 633 and 637.

Example Web Interfaces for Flexible Capacity Reservations

FIG. 8 illustrates a portion of an example web-based interface that may be implemented to allow clients to submit resource reservation requests, according to some embodiments (an example interface for reservation modification requests is shown in FIG. 9). The interface may be implemented by a standalone interface manager 182 in some embodiments, and by a subcomponent of the resource manager 180 in other embodiments. As shown, the interface may include a web page 800 that includes a message area 803 and several form fields usable by clients to provide reservation preferences. The client 148 may specify the type of resource that is to be reserved, such as compute vs. storage vs. bandwidth, using field 807. The level of capacity or the instance size to be reserved may be selected using element 809.

In the illustrated example, clients are allowed to specify, using field 811, whether they wish to have the ability to upgrade or downgrade the reserved capacity level, e.g., to change the reserved instance size after the initial reservation is made. Clients may indicate the desired duration of the reservation using element 813, and whether they would like the ability to later modify the reservation duration using element 815. The initial uptime ratio setting (e.g., lo vs. medium vs. high uptime ratio, which may have an impact on the total price of the reservation) may be selectable via element 817, and whether the client wants the ability to change the uptime ratio later may be indicated via element 819. In some embodiments the client may also be able to indicate whether they want to opt in for the dynamic instance migration capability described above in conjunction with the description of FIG. 7; field 821 may be used for this indication. Indications of other client preferences, such as a preferred data center location or availability zone location specified via field 823, may also be supported by the interface in some embodiments.

A number of pricing-related fields are shown in the example web page 800, at least some of which may be filled in automatically by the interface manager 182 in response to the entries made by the client in other fields of page 800, and may not be modifiable directly by the client. Field 825 shows a base price, which may depend for example on the initial capacity level specified (field 809), the initial reservation duration (field 813), and the initial uptime ratio (field 817). Depending on the different reservation modification-related capabilities desired by the client, a number of add-on fees are also shown. The cost of capacity upgradability (indicated via field 811) may be shown in field 827, the cost of reservation term flexibility (selected by the client via field 815) may be indicated via field 829, and the cost of flexible uptime ratios (selected in field 819) may be shown in field 831. The total cost for the reservation may be shown in field 833. In some embodiments the various pricing components shown in FIG. 8 may be further broken down into upfront fees and usage-based fees. The client may submit the reservation request via button 891. In different embodiments, at least some of the fields shown in web page 800 may be omitted, other fields useful for specifying reservation preferences may be added, and/or the sequence in which the illustrated fields are arranged may differ from that shown in FIG. 8. In some embodiments web page 800 may include a field showing an added cost for dynamic instance migration. In embodiments where the costs of added flexibility are clearly shown as in FIG. 8, the client may be able to try out various "what-if" scenarios before deciding on the specific preferences for the desired reservation.

FIG. 9 illustrates a portion of an example web-based interface that may be implemented to allow clients to submit resource reservation modification requests, according to some embodiments. In the illustrated example, the interface comprises a web page 900 with a message area 903 and one or more reservation details areas 971 for the client's existing reservations. The client currently has one standard medium instance "m1.medium" reserved for a three year term ending on Mar. 21, 2013, as shown in area 905. The resource manager 180 has provided some alternatives for modification to the existing reservation in the area below message 907 of web page 900. For example, the client 148 may choose to upgrade to a large instance within the same standard instance family (option 909), or convert the existing medium instance to two small instances (option 911), or replace the medium instance with a small instance and resell the freed-up capacity (913). The client is also given the option, via element 915, of indicating the specific modification desired, if none of the options presented by the resource manager is acceptable.

Interface elements for requesting changes to the reservation term are also shown in the example web page 900. Element 919 allows the client to specify that the reservation term should be extended to 2014, while element 921 may allow the client to specify any desired term. Button 990 may be used to proceed to the next portion of the web interface in some embodiments. It is noted that while the example shown in FIG. 9 does not include interface elements for specifying changes to uptime levels, one or more elements similar to 909, 911, 913, 915, 919 or 921 may be presented to allow the client to indicate preferences or choices for changes to the uptime ratio setting for an existing reservation.

Example Use Cases

The techniques described above for supporting flexible capacity pool reservations may be useful in a wide variety of environments. As the number of applications being deployed to cloud-based environments grows, the need to support dynamically-changing needs of cloud customers will also tend to grow. The ability of a resource manager to support reservation modifications that allow greater flexibility to customers that wish to retain some of the guarantees and pricing advantages associated with long-term reservations, but also want to be able to adapt their reservations to changing workloads and budgets, is likely to lead to greater levels of customer satisfaction and retention.

The functionality described above may be particularly appealing to provider network operators that implement instance families (e.g., similar to those shown in FIG. 2) using a small set of underlying hardware platform types, which may make it easier to reconfigure virtual machines of different performance capabilities very easily. The costs of modifying reservations may be relatively small in such environments, while the potential benefits to customers may be quite substantial. The risks to a customer of making an inappropriate instance size choice at the time a long-term reservation is made may be minimal as long as the pricing associated with reservation changes remains reasonable.

Illustrative Computer System

Figure 10:
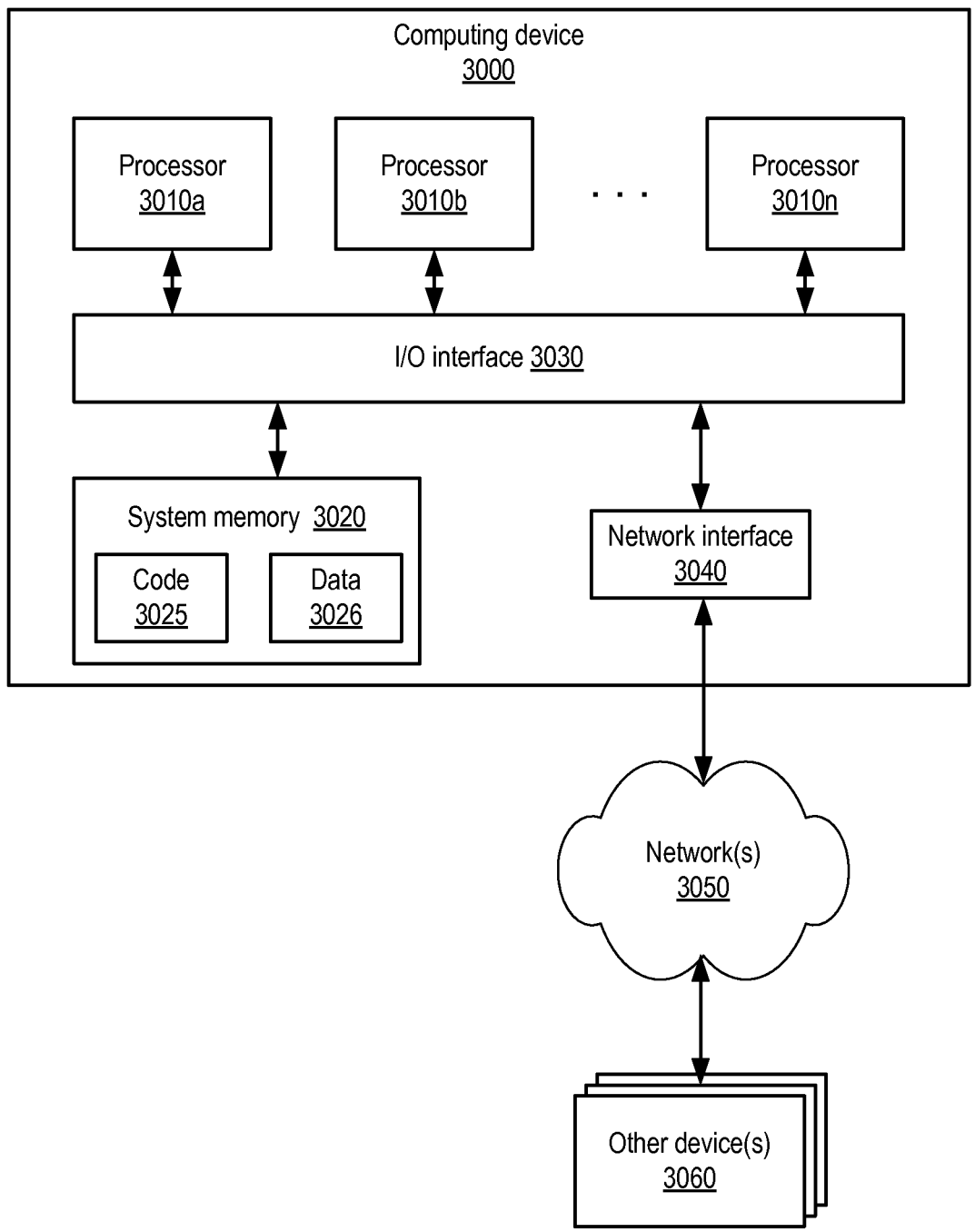
FIG. 10 is a block diagram illustrating an example computing device that may be used in some embodiments.

In at least some embodiments, a server that implements a portion or all of one or more of the technologies described herein, including the techniques to implement the functionality of resource manager 180, interface manager 182 and migration manager 181 may include a general-purpose computer system that includes or is configured to access one or more computer-accessible media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 9, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    implementing a programmatic interface for a provider network, wherein the programmatic interface allows clients of the provider network to request a modification of an existing resource instance reservation;
    receiving, via the programmatic interface, a resource reservation modification request from a client of the provider network indicating a desired modified discrete resource capacity level selected from a plurality of discrete resource capacity levels to be applied to an existing reservation of the client with the provider network for an original resource instance with an original discrete resource capacity level and an original reservation duration, wherein one or more resources of a plurality of resources of the provider network are used to implement the resource instance of the existing reservation, wherein the plurality of resources of the provider network are implemented on one or more hardware platforms of a plurality of computing devices, wherein at least some of the plurality of resources of the provider network are reserved in resource instances having respective ones of the plurality of discrete resource capacity levels including at least a first capacity level corresponding to a particular performance capability and a second capacity level corresponding to a higher performance capability,
        wherein the resource reservation modification request received from the client indicates:
            two or more existing reservations of the client that are to be combined into a combined reservation having one of the discrete capacity levels;
            two or more existing reservations of the client that are to be combined and augmented with additional capacity to form an increased capacity reservation having one of the discrete capacity levels; or
            an existing reservation of the client that is to be divided into two or more lesser capacity reservations each having one of the discrete capacity levels;
    identifying, by a resource manager implemented on one or more computers of the provider network, one or more hardware platforms of the provider network that can accommodate the reservation modification request to provide the modified resource capacity;
    determining, by the resource manager, one or more pricing components to be billed to the client for modification of the two or more existing reservations or the existing reservation, based at least in part on (a) a difference between one or more desired modified resource capacity levels of the two or more existing reservations or the existing reservation and one or more original resource capacity levels of one or more original resource instances of the two or more existing reservations or the existing reservation and (b) a remaining portion of one or more original reservation durations of the two or more existing reservations or the existing reservation;
    modifying, by the resource manager, the resource instance of the existing reservation in accordance with the resource reservation modification request, wherein said modifying comprises:
        combining the discrete resource capacity level of the resource instance of the existing reservation with a discrete resource capacity level of another resource instance of another existing reservation from the one or more identified resources such that a resulting modified resource instance has a resource capacity level corresponding to one of the discrete resource capacity levels;
        combining the discrete capacity level of the resource instance of the existing reservation with a discrete resource capacity level of another resource instance of another existing reservation from the one or more identified resources and augmenting the combined reservations with additional capacity such that a resulting modified resource instance has a resource capacity level corresponding to one of the discrete resource capacity levels; or
        dividing the discrete resource capacity level of the resource instance of the existing reservation such that at least two resulting modified resource instances have resource capacity levels corresponding to one of the discrete resource capacity levels;
    receiving, at a migration manager implemented on one or more computers of the provider network, an indication from the resource manager of the one or more hardware platforms identified to implement the modified resource instance or the at least two resulting modified resource instance; and
    responsive to said receiving the indication:
        copying, by the migration manager, at least a portion of an execution environment comprising one or more applications in a running-state, from one or more hardware platforms implementing the resource instance to the one or more hardware platforms identified to implement the resulting modified resource instance or the at least one resulting modified resource instance; and
        launching, by the migration manager, the one or more applications on the one or more identified hardware platforms that implement the modified resource instance or the at least one of the at least two resulting modified resource instances,
        wherein said copying and said launching effects a live migration of the one or more applications in the running state.

2. The method as recited in claim 1, further comprising:
    providing, via the programmatic interface, an indication to the client of a plurality of reservable resource capacity levels for resource instances, including the first capacity level and the second capacity level;

wherein the resource reservation modification request comprises a request to upgrade from the first capacity level to the second capacity level;

wherein said modifying the resource instance comprises combining the discrete resource capacity level of the resource instance of the existing reservation with the discrete resource capacity level of the other resource instance such that the resulting modified resource instance has the desired second capacity level.

3. The method as recited in claim 1, further comprising:

providing, via the programmatic interface, an indication to the client of a plurality of reservable resource capacity levels, including the first capacity level and the second capacity level;

wherein the resource reservation modification request comprises a request to downgrade from the second capacity level to the first capacity level;

wherein said modifying the resource instance comprises dividing the discrete resource capacity level of the resource instance of the existing reservation such that at least one of the at least two resulting modified resource instances has the desired first capacity level.

4. The method as recited in claim 3, further comprising:

identifying at least one unit of reservable resource capacity at one capacity level of the plurality of reservable resource capacity levels that can be resold as a result of dividing the discrete resource capacity level of the resource instance of the existing reservation; and placing the at least one unit of reservable resource capacity for sale in a reservation resale marketplace.

5. The method as recited in claim 1, wherein the resource reservation modification request comprises a request to modify the original reservation duration to a different reservation duration, further comprising:

determining an additional pricing component to be billed to the client for modification of the original reservation duration, based at least in part on the remaining portion of the original reservation duration; and modifying the original reservation duration to the different reservation duration.

6. The method as recited in claim 1, wherein the one or more hardware platforms identified to provide the modified resource capacity include at least one resource implemented using a particular hardware platform currently in use by the client in accordance with the existing reservation.

7. The method as recited in claim 1, further comprising:

modifying one or more virtualization configuration settings at a computing device used for the one or more resources.

8. The method as recited in claim 7, wherein the one or more virtualization settings include at least one of: (a) a mapping between a processing core and a virtual machine (b) a mapping between a memory component and a virtual machine (c) a mapping between a storage device and a virtual machine or (d) a mapping between a network device and a virtual machine.

9. The method as recited in claim 1, further comprising:

prior to generating the existing reservation, providing, to the client, an indication of a particular pricing component associated with reservation capacity modifications.

10. The method as recited in claim 1, wherein the one or more pricing components are determined using an options pricing model.

11. One or more non-transitory computer-accessible storage media storing program instructions that when executed on, or across, one or more processors:

implement a programmatic interface for a provider network, wherein the programmatic interface allows clients of the provider network to request a modification of an existing resource instance reservation, wherein the request indicates:

two or more existing reservations of the client that are to be combined into a combined reservation having one of a plurality of supported discrete capacity levels;

two or more existing reservations of the client that are to be combined and augmented with additional capacity to form an increased capacity reservation having one of the supported discrete capacity levels; or an existing reservation of the client that is to be divided into two or more lesser capacity reservations each having one of the supported discrete capacity levels;

receive, via the programmatic interface, a reservation modification request from a client indicating a desired modified discrete resource capacity level selected from the plurality of supported discrete resource capacity levels to be applied to an existing reservation of the client with a provider network for an original resource instance with an original discrete resource capacity level and an original reservation duration; and in response to receiving the resource reservation modification request from the client:

identify one or more hardware platforms of the provider network that can accommodate the reservation modification request to provide the desired modified resource capacity;

determine one or more pricing components to be billed to the client for modifying the existing reservation, based at least in part on (a) a difference between one or more desired modified resource capacity levels of the two or more existing reservations or the existing reservation and one or more original resource capacity levels of one or more original resource instances of the two or more existing reservations or the existing reservation and (b) a remaining portion of one or more original reservation durations of the two or more existing reservations or the existing reservation;

modify the resource instance of the existing reservation in accordance with the resource reservation modification request, wherein to modify the resource instance, the program instruction when executed on the one or more processors:

cause the discrete resource capacity level of the resource instance of the existing reservation to be combined with a discrete resource capacity level of another resource instance of another existing reservation from the one or more identified resources such that a resulting modified resource instance has a resource capacity level corresponding to one of the discrete resource capacity levels;

cause the discrete capacity level of the resource instance of the existing reservation to be combined with a discrete resource capacity level of another resource instance of another existing reservation from the one or more identified resources and augmenting the combined reservations with additional capacity such that a resulting modified resource instance has a resource capacity level corresponding to one of the discrete resource capacity levels; or cause the discrete resource capacity level of the resource instance of the existing reservation to be divided such that at least two resulting modified resource instances have resource capacity levels corresponding to one of the discrete resource capacity levels;

cause at least a portion of an execution environment, comprising one or more applications in a running-state, of the original resource instance to be copied from one or more hardware platforms implementing the original resource instance to one or more hardware platforms identified to implement the modified resource instance or the at least one of the at least two resulting modified resource instances;

cause the one or more applications to be launched on the one or more hardware platforms that implement the modified resource instance or the at least one of the at least two resulting modified resource instances, wherein said copying and said launching effects a live migration of the one or more applications in the running state; and provide a response to the client indicating the one or more pricing components.

12. The one or more storage media as recited in claim 11, wherein the instructions when executed on, or across, the one or more processors:

provide, via the programmatic interface, an indication to the client of a plurality of reservable resource capacity levels, including the first capacity level and the second capacity level;

wherein the resource reservation modification request comprises a request to upgrade from the first capacity level to the second capacity level;

wherein to modify the resource instance, the program instruction when executed on the one or more processors combine the discrete resource capacity level of the resource instance of the existing reservation with the discrete resource capacity level of the other resource instance such that the resulting modified resource instance has the desired second capacity level.

13. The one or more storage medium as recited in claim 11, wherein the instructions when executed on, or across, the one or more processors:

provide, via the programmatic interface, an indication to the client of a plurality of reservable resource capacity levels, including the first capacity level and the second capacity level;

wherein the resource reservation modification request comprises a request to downgrade from the second capacity level to the first capacity level;

wherein to modify the resource instance, the program instruction when executed on the one or more processors divide the discrete resource capacity level of the resource instance such that at least one of the at least two resulting modified resource instances has the desired first capacity level.

14. The one or more storage medium as recited in claim 13, wherein the instructions when executed on, or across, the one or more processors:

identify at least one unit of reservable resource capacity at one capacity level of the plurality of reservable resource capacity levels that can be resold as a result of the downgrade; and place the at least one unit of reservable resource capacity for sale in a reservation resale marketplace.

15. The one or more storage medium as recited in claim 11, wherein the resource reservation modification request comprises a request to modify the original reservation duration to a different reservation duration, wherein the instructions when executed on, or across, the one or more processors:

determine an additional pricing component to be billed to the client for modification of the original reservation duration, based at least in part on the remaining portion of the original reservation duration; and modify the original reservation duration to the different reservation duration.

16. The one or more storage medium as recited in claim 11, wherein the instructions when executed on, or across, the one or more processors:

identify one or more resources of the plurality of resources to provide the modified resource capacity, including at least one resource implemented using a particular computing device that is currently not in use by the client.

17. The one or more storage medium as recited in claim 11, wherein the instructions when executed on, or across, the one or more processors:

modify one or more virtualization configuration settings at a hardware platform used for one or more resources of the plurality of resources identified to provide the modified resource capacity.

18. The one or more storage medium as recited in claim 10, wherein the existing reservation has an associated original uptime ratio for the original resource capacity, wherein the original uptime ratio is indicative of a ratio of (a) a duration for which the original resource capacity is expected to remain activated during the original reservation duration to (b) the original reservation duration, wherein the resource reservation modification request includes a desired modified uptime ratio, wherein the instructions when executed on, or across, the one or more processors:

determine the one or more pricing components to be billed to the client for modifying the existing reservation, based at least in part on a difference between the modified uptime ratio and the original uptime ratio.

19. The one or more storage medium as recited in claim 11, wherein the instructions when executed on, or across, the one or more processors:

provide, prior to modifying the existing reservation, an estimate of the one or more pricing components to the client.

20. A system, comprising:

a provider network comprising:

a plurality of computing devices configured to implement a plurality of resources of the provider network, wherein the plurality of resources are implemented on one or more respective hardware platforms of the plurality of computing devices of the provider network, wherein at least some of the plurality of resources are reserved in resource instances having a plurality of discrete resource capacity levels including at least a first capacity level corresponding to a particular performance capability and a second capacity level corresponding to a higher performance capability;

one or more computing devices configured to implement a resource manager for the provider network;

one or more computing devices configured to implement an interface manager for the provider network; and one or more computing devices configured to implement a migration manager for the provider network;

wherein the interface manager is configured to:

implement a programmatic interface configured to allow clients of the provider network to request a modification of an existing resource instance reservation; and receive, via the programmatic interface, a reservation modification request from a client indicating:

two or more existing resource instance reservations of the client that are to be combined into a combined resource instance reservation having one of the discrete capacity levels;

two or more existing resource instance reservations of the client that are to be combined and augmented with additional capacity to form an increased capacity resource instance having one of the discrete capacity levels; or an existing resource instance reservation of the client that is to be divided into two or more lesser capacity resource instances each having one of the discrete capacity levels;

wherein the resource manager is configured to:

in response to the reservation modification request from the client:

determine one or more pricing components to be billed to the client for modification of the two or more existing resource instance reservations, or the existing resource instance reservation, based at least in part on (a) a difference between one or more desired modified resource capacity levels of the two or more existing resource instance reservations or the existing resource instance reservation and one or more original resource capacity levels of one or more original resource instances of the two or more existing resource instance reservations or the existing resource instance reservation and (b) a remaining portion of one or more original reservation durations of the two or more existing resource instance reservations or the existing resource instance reservation;

modify the two or more existing resource instance reservations, or the existing resource instance reservation, in accordance with the reservation modification request, wherein to modify the existing reservations, or reservation, the resource manager is configured to:

combine discrete resource capacity levels of two or more of original resource instances to result in a modified resource instance having a resource capacity level corresponding to one of the discrete resource capacity levels;

combine the discrete resource capacity levels of the two or more original resource instances and augment the combined two or more original resource instances with additional capacity to result in a modified resource instance having a resource capacity level corresponding to one of the discrete resource capacity levels; or divide the discrete resource capacity level of one of the original resource instances such that two or more resulting modified resource instances have resource capacity levels corresponding to one of the discrete resource capacity levels; and provide a response to the client indicating (a) the modification of the existing two or more resource instance reservations, or the existing resource instance reservation and (b) the one or more pricing components; and identify one or more hardware platforms to implement the modified resource instance or the two or more resulting modified resource instances; and wherein the migration manager is configured to:

receive an indication from the resource manager of the one or more hardware platforms identified to implement the modified resource instance or the two or more resulting modified resource instances; and in response to receiving the indication:

copy at least a portion of an execution environment, comprising one or more applications in a running-state, from one or more hardware platforms implementing a least one of the original resource instances to the one or more hardware platforms identified to implement the modified resource instance or at least one of the two or more resulting modified resource instances; and launch the one or more applications on the one or more identified hardware platforms that implement the modified resource instance or the at least one of the two or more resulting modified resource instances, wherein said copy and said launch effects a live migration of the one or more applications in the running state.

21. The system as recited in claim 20, wherein the resource manager is further configured to:

provide, via the interface manager, an indication to the client of a plurality of reservable resource capacity levels, including the first capacity level and the second capacity level;

wherein the reservation modification request comprises a request to upgrade from the first capacity level to the second capacity level;

wherein to modify the existing two or more existing resource instance reservations, the resource manager is configured to combine the discrete resource capacity level of one of the two or more existing resource instance reservations with the discrete resource capacity level of another one of the two or more existing resource instance reservations to result in a modified resource instance reservation with the requested second capacity level.

22. The system as recited in claim 20, wherein the resource manager is further configured to:

provide, via the interface manager, an indication to the client of a plurality of reservable resource capacity levels, including the first capacity level and the second capacity level;

wherein the reservation modification request comprises a request to downgrade from the second capacity level to the first capacity level, wherein to modify the existing resource instance reservation, the resource manager is configured to divide the discrete resource capacity level of the existing resource instance reservation to result in at least one modified resource instance reservation with the first capacity level.

23. The system as recited in claim 22, wherein the resource manager is further configured to:

identify at least one unit of reservable resource capacity at one capacity level of the plurality of reservable resource capacity levels that can be resold as a result of the downgrade; and place the at least one unit of reservable resource capacity for sale in a reservation resale marketplace.

24. The system as recited in claim 20, wherein the reservation modification request comprises a request to modify an original reservation duration to a different reservation duration, wherein the resource manager is further configured to:
- determine an additional pricing component to be billed to the client for modification of the original reservation duration, based at least in part on the remaining portion of the original reservation duration; and
- modify the original reservation duration to the different reservation duration;
- wherein the response to the client includes an indication of (a) the modification of the original reservation duration and (b) the additional pricing component.

* * * * *